(12) United States Patent
Nishino et al.

(10) Patent No.: US 8,160,449 B2
(45) Date of Patent: Apr. 17, 2012

(54) ELECTRONIC APPARATUS

(75) Inventors: Naoyuki Nishino, Ashigarakami-gun (JP); Yasunori Ohta, Ashigarakami-gun (JP); Eiichi Kito, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 565 days.

(21) Appl. No.: 12/320,509

(22) Filed: Jan. 28, 2009

(65) Prior Publication Data
US 2009/0190923 A1  Jul. 30, 2009

(30) Foreign Application Priority Data
Jan. 30, 2008 (JP) ................................. 2008-019820

(51) Int. Cl.
*H04B 10/00* (2006.01)
(52) U.S. Cl. ............ 398/129; 398/128; 398/118; 398/26
(58) Field of Classification Search .................. 398/129, 398/128, 118, 26
See application file for complete search history.

(56) References Cited

U.S. PATENT DOCUMENTS 7,639,951 B2 * 12/2009 Hirayama ...................... 398/128

FOREIGN PATENT DOCUMENTS

| JP | 60245324 A | 12/1985 |
|---|---|---|
| JP | 4334136 A | 11/1992 |
| JP | B 3494683 | 6/1995 |
| JP | 2003-209520 A | 7/2003 |
| JP | 2005-047660 A | 2/2005 |
| JP | 2005117294 A | 4/2005 |
| JP | 2006067333 A | 3/2006 |
| JP | 2006320532 A | 11/2006 |
| JP | 2006334280 A | 12/2006 |
| JP | 2007007243 A | 1/2007 |
| JP | A 2007-81134 | 3/2007 |
| JP | 2007128255 A | 5/2007 |

OTHER PUBLICATIONS

"The Realization of Infrared Wireless Communication at a Transmission Speed of 1 Gbit/s a Using a Mobile Telephone", KDDI R&D Laboratories, Jan. 21, 2008.*
Japanese Office Action issued on Oct. 11, 2011 (Japanese Patent Application No. 2008-019820) with English Translation.
KDDI R&D Laboratories, "The Realization of Infrared Wireless Communications at a Transmission Speed of 1Gbit/s Using a Mobile Telephone", online: Jan. 21, 2008, <URL:http://www.kddilabs.jp/press/img/83_1.pdf>.

* cited by examiner

*Primary Examiner* — Kinam Park
(74) *Attorney, Agent, or Firm* — SOLARIS Intellectual Property Group, PLLC

(57) ABSTRACT

A system including a device equipped with a reception section, a reception condition detection section and a control section. A partner device emits laser light and modulates the laser light in accordance with transfer subject information. Relative positions of the partner device and the device are adjusted to a communication-possible position, at which the laser light from the partner device is incident in a light reception region of the device. In this state, the reception section receives the transmission subject information from the partner device by detecting the incident laser light and demodulating the transmission subject information therefrom. The reception condition detection section detects a deterioration in a reception condition. If a deterioration in the reception condition is detected, the control section produces a warning or stops emissions of laser light from the partner device.

14 Claims, 17 Drawing Sheets

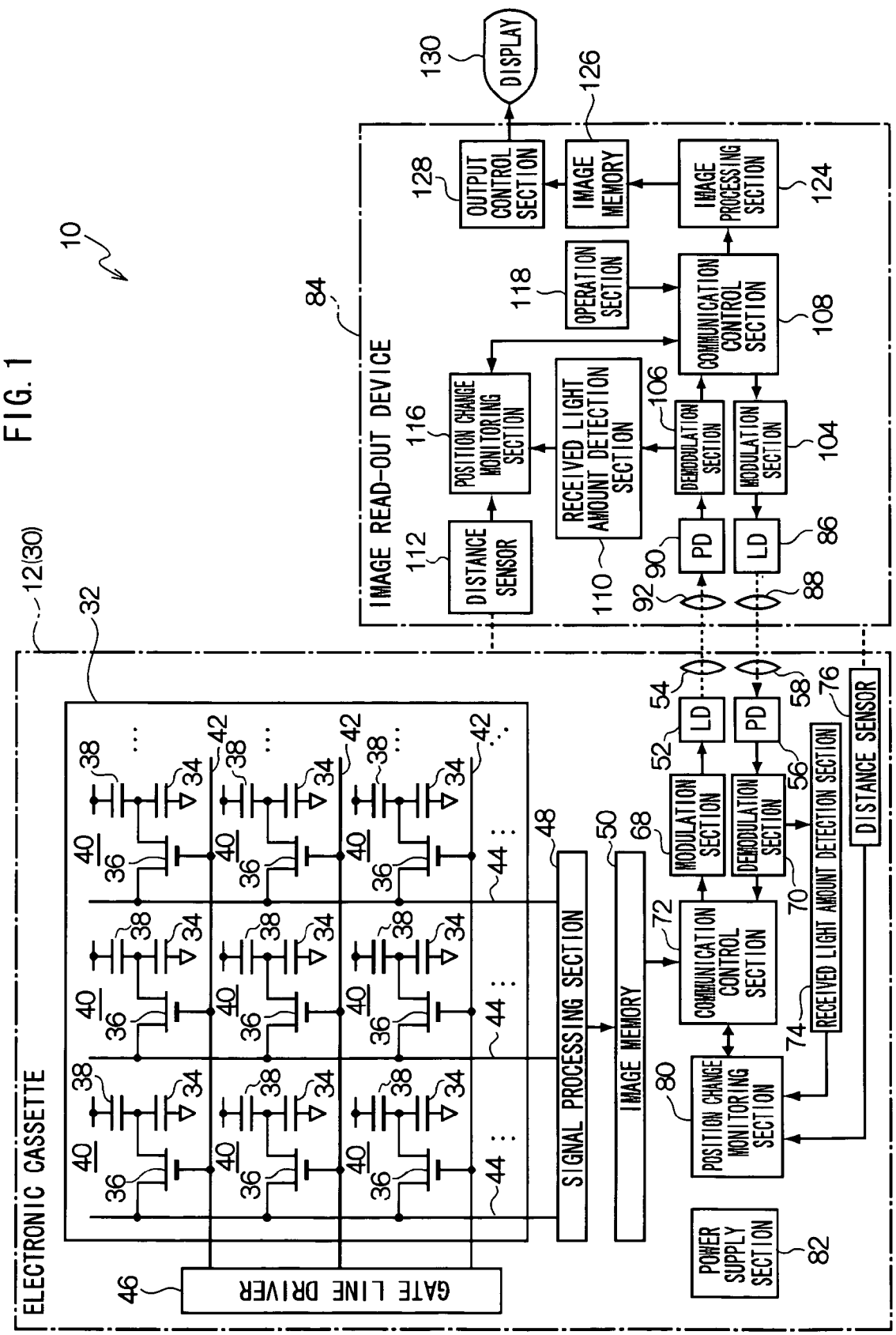

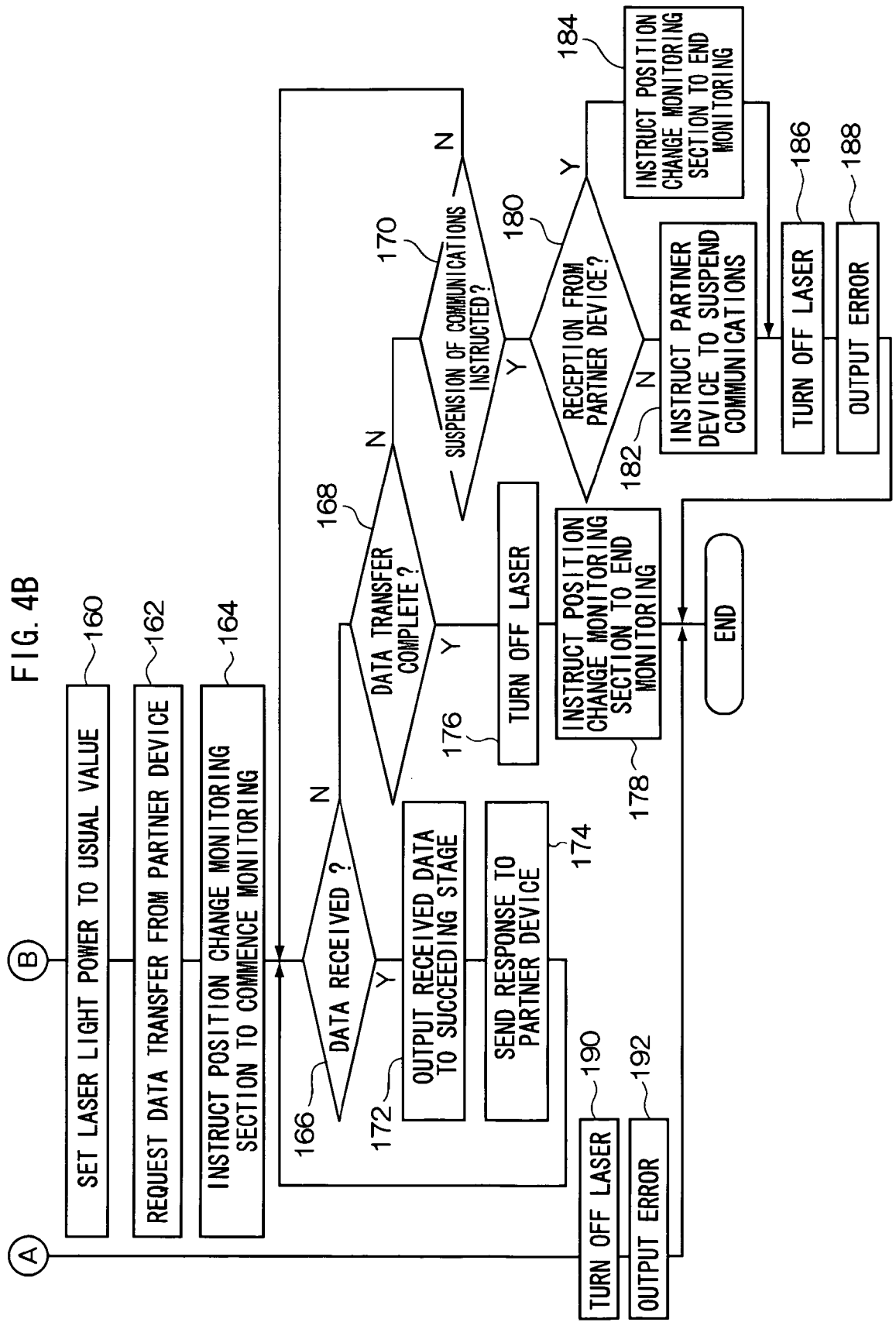

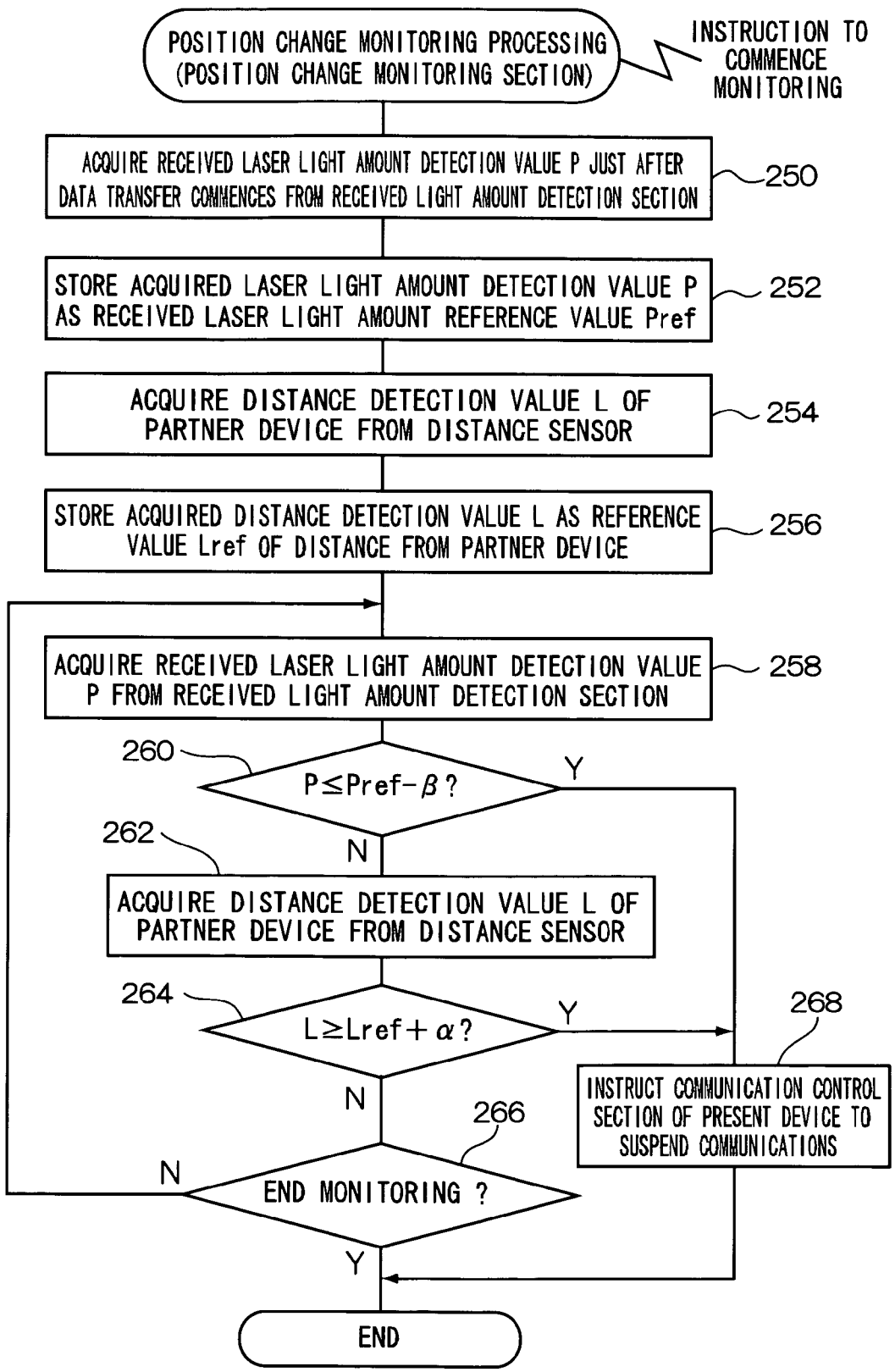

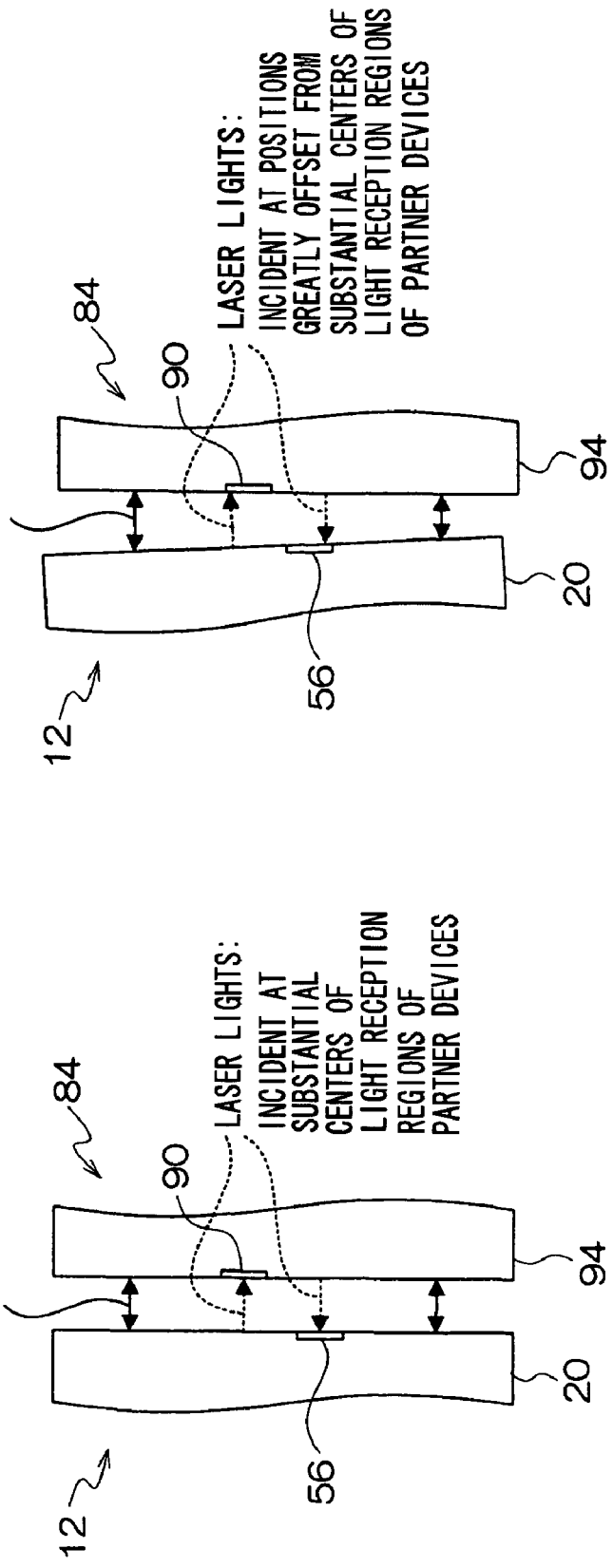

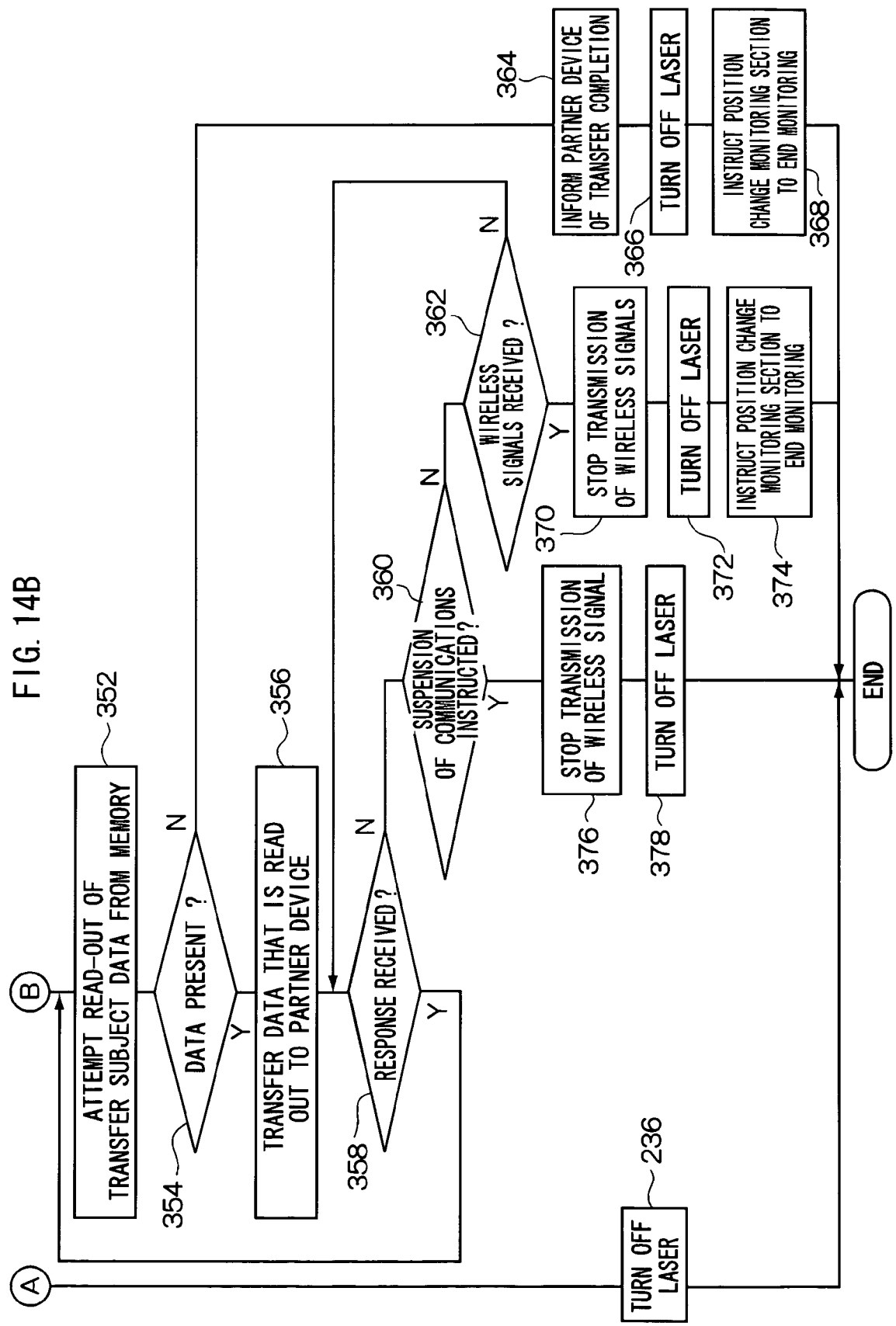

ELECTRONIC APPARATUS

CROSS-REFERENCE TO RELATED APPLICATION

This application is based on and claims priority under 35 USC 119 from Japanese Patent Application No. 2008-019820 filed on Jan. 30, 2008, the disclosure of which is incorporated by reference herein.

BACKGROUND

1. Technical Field

The present invention relates to an electronic apparatus, a system comprises a device and a partner device, and more particularly to an electronic apparatus that implements exchanges of information with a partner device with laser light modulated in accordance with transmission subject information.

2. Related Art

Recently, technologies have been proposed that realize wireless communications at very high transmission rates (for example, 1 Gb/s) using laser light in the infrared wavelength range.

All patents, patent publications, foreign patent-related publications, and non-patent literature are hereby expressly incorporated by reference herein.

See, for example, the following reference.
Document 1:
KDDI R&D Laboratories, "The Realization of Infrared Wireless Communications at a Transmission Speed of 1 Gbit/s Using a Mobile Telephone", online: Jan. 21, 2008, <URL:http://www.kddilabs.jp/press/img/83_1.pdf>.

When such technology is employed for exchanges of data between arbitrary electronic apparatuses, even if one or more of the electronic apparatuses is portable and large quantities of data are to be exchanged, it is possible to complete exchanges of large quantities of data in short times without the electronic apparatuses that are performing the exchange of data having to be connected together by a communications cable or the like. Thus, a great reduction in communication durations of wireless communications between previously known devices can be realized. Moreover, this technology is capable of realizing exchanges of large quantities of data by wireless communications between apparatuses that conventionally would not be expected to exchange data by wireless communications, and employment of this technology for numerous applications is expected.

For example, Japanese Patent No. 3,494,683 discloses a radiation detector cassette (a portable radiographic image conversion device, also referred to hereinafter as an electronic cassette) with a structure in which a radiation detector and an image memory are incorporated therein. A radiation image detected by the radiation detector is stored in the image memory as image data, and the image data is read out from the image memory, converted to wireless signals, and outputted to an external signal processing circuit. In the clinical field, there are many apparatuses that it is not desirable to dispose in environments in which electromagnetic waves are being radiated. Therefore, wireless communications that are excellent for the above-described cassette have conventionally been limited to infrared communications based on standards such as IrDA (Infrared Data Association) and the like. However, infrared communications conforming to the IrDA standard have communication rates of the order of 115 kb/s to 6 Mb/s. With this kind of clinical apparatus, even if image data is compressed, reversible compression with a low compression rate is selected in order to avoid adverse effects in interpretation. Therefore, transfers of image data have very long durations. If the aforementioned communication by laser light is employed for wireless communications of the above-described cassette, a great reduction in image data transfer times may be realized.

Relating to the above, Japanese Patent Application Laid-Open (JP-A) No. 2007-81134 has disclosed a technology that improves the stability of an apparatus that deals with laser light. An optical communications module has a structure that is provided with a laser diode, which is disposed in a leadframe, and a transparent resin portion, which serves as an adjustment portion for widening a distribution of optical output and adjusting output of the laser diode. In this optical communications module, the transparent resin portion is constituted to include a transparent resin, which seals the laser diode, and a glass filler, which is added to the transparent resin, is uniformly distributed through the whole of the transparent resin, and promotes transmission of light and a diffusion function.

In a mode in which electronic apparatuses carry out wireless communications with one another using laser light, if one or more of the electronic apparatuses is portable, the wireless communications are carried out in a state in which both the electronic apparatuses are disposed with a positional relationship such that wireless communications with laser light are possible. However, because at least one of the electronic apparatuses is portable, if a pushing force, vibration or the like is applied to a casing of the electronic apparatus during the communications with laser light, the relative positions of the electronic apparatuses are altered. With this change in the relative positions, laser light may leak out from a gap between the electronic apparatuses.

The technology described in JP-A No. 2007-81134 is a technology that, by repeatedly refracting light from the laser diode with the glass filler, realizes a widening of the light output distribution of the optical communications module and a reduction in light output amounts of the optical communications module. However, this does not contribute in any way to preventing leakages of laser light when relative positions of electronic apparatuses change during communications by laser light.

SUMMARY

The present invention has been made in consideration of the above circumstances, and an object is to provide an electronic apparatus that prevents a leakage of laser light in a case in which relative positions of devices change during communication by laser light.

In order to achieve the object, present invention provides a system including a device and a partner device; the system including:

a reception section that, in a state in which relative positions of a housing of the device and a housing of the partner device are adjusted to a communication-possible position, receives transmission subject information from the partner device by detecting laser light that is incident in a light reception region provided on an outer face of the housing of the device and demodulating the transmission subject information from results of detection of the laser light, the partner device including
  a first emission section that emits the laser light and
  a first modulation section that modulates the laser light emitted from the first emission section in accordance with the transmission subject information, and, in the state in which the relative positions of the housings of the device and the partner device are adjusted to the communication-possible position, the laser light emitted from the first emission section of the partner device being incident in the light reception region;

a reception condition detection section that detects deterioration of a reception condition in reception of the transmission subject information from the partner device by the reception section; and a control section that, if deterioration of the reception condition is detected by the reception condition detection section, implements at least one of producing a warning and stopping emission of the laser light from the partner device.

According to the present invention, the partner device is provided with the first emission section that emits laser light and the first modulation section that modulates the laser light emitted from the first emission section in accordance with the transmission subject information. In the state in which the relative positions of the housing of the device (present device) and the housing of the partner device are adjusted to the communication-possible position at which the laser light emitted from the first emission section of the partner device is incident within the light reception region provided on the external face of the housing of the device, the reception section receives the transmission subject information from the partner device by detecting the laser light that is incident within the light reception region and demodulating the transmission subject information from results of detection of the laser light.

The laser light may be non-visible laser light with a wavelength outside the visible range. Moreover, the non-visible laser light may be laser light with a wavelength in the infrared range.

The partner device may be one of a portable radiographic image conversion panel, an imaging device and a portable telephone.

The reception condition detection section detects a deterioration of a reception condition in reception of the transmission subject information from the partner device by the reception section.

If a deterioration of the reception condition is detected by the reception condition detection section, the control section produces a warning or stops emissions of laser light from the partner device.

The reception condition detection section may judge that the reception condition has deteriorated if light amounts of the laser light detected by the reception section fall below a threshold.

In such a case, the reception condition detection section may specify a reference value on the basis of a light amount of laser light detected by the reception section in the state in which the relative positions of the housing of the partner device and the housing of the device are adjusted to the communication-possible position and laser light is incident within the light reception region, and use a value that is smaller than the specified reference value by a predetermined value as the threshold.

Furthermore, the reception condition detection section may specify as the reference value a value that represents a light amount of laser light detected by the reception section at a point in time at which the reception section has commenced reception of the transmission subject information from the partner device, or a light amount of laser light detected by the reception section in a period from the reception section commencing reception of the transmission subject information from the partner device until a predetermined duration has passed. For example, any of the following may be employed as the representing value: a maximum value or average value of light amounts of the laser light in a period in which the laser light is detected, or a light amount value at which a cumulative frequency from the maximum value or minimum value in a histogram of light amounts of the laser light reaches a predetermined value.

The reception condition detection section may judge that the reception condition has deteriorated if an error rate detected by the reception section in reception by the reception section of the transmission subject information from the partner device rises above a threshold.

In such a case, the reception condition detection section may specify a reference value on the basis of an error rate detected by the reception section in the state in which the relative positions of the housing of the partner device and the housing of the device are adjusted to the communication-possible position and laser light is incident within the light reception region, and use a value that is greater than the specified reference value by a predetermined value as the threshold.

Furthermore, the reception condition detection section may specify as the reference value a value that represents an error rate detected by the reception section at a point in time at which the reception section has commenced reception of the transmission subject information from the partner device, or an error rate detected by the reception section in a period from the reception section commencing reception of the transmission subject information from the partner device until a predetermined duration has passed. For example, any of the following may be employed as the representing value: a maximum value or average value of error rates in a period in which the error rate is detected, or an error rate value at which a cumulative frequency from the maximum value or minimum value in a histogram of error rates reaches a predetermined value.

The electronic apparatus of the present invention may be provided with a first transmission section that is capable of transmitting information to the partner device, and the control section may stop emissions of laser light from the partner device by causing instruction information that instructs a stoppage of emissions of laser light to be transmitted to the partner device by the first reception section.

The electronic apparatus of the present invention may be provided with a second transmission section that, while the reception section is satisfactorily receiving the transmission subject information from the partner device, periodically transmits predetermined information to the partner device, the partner device being structured to, while periodically receiving the predetermined information, emit the laser light modulated in accordance with the transmission subject information from the emission section. The control section stops emissions of the laser light from the partner device by causing transmission of the predetermined information to the partner device by the second transmission section to be stopped.

The electronic apparatus of the present invention may be constituted to further include a second emission section that emits laser light and a second modulation section that modulates the laser light emitted from the second emission section in accordance with transmission subject information, and to implement two-way communications with the partner device by laser light. The control section stops emission of the laser light from the second emission section if emission of the laser light from the partner device is stopped.

The present invention as described above has an excellent effect in being capable of preventing leakages of laser light in cases in which relative positions of devices change during communication by laser light, by producing a warning or causing emissions of laser light from a partner device to be stopped when a deterioration in a reception condition is detected during reception of transmission subject information from the partner device.

BRIEF DESCRIPTION OF THE DRAWINGS

Exemplary embodiments of the present invention will be described in detail based on the following figures, wherein:

FIG. 1 is a block diagram showing schematic structure of an electronic cassette and image read-out device relating to a first exemplary embodiment;

FIG. 4B is a flowchart showing details of data read-out processing;

FIG. 6 is a flowchart showing details of position change monitoring processing relating to the first exemplary embodiment;

FIG. 8A and FIG. 8B are conceptual views for explaining detection of a change in position on the basis of distance detection values;

FIG. 14B is a flowchart showing details of data transfer processing relating to the third exemplary embodiment.

DETAILED DESCRIPTION

Herebelow, examples of embodiments of the present invention will be described in detail with reference to the drawings.

First Exemplary Embodiment

FIG. 1 shows a radiographic image management system 10 relating to the present exemplary embodiment. The radiographic image management system 10 is constituted of an electronic cassette 12 (30) and an image read-out device 84. The electronic cassette 12 (30) is a portable radiographic image conversion device that features portability, converts image information to image data each time radiation carrying image information is irradiated thereat, and is capable of cumulative memorization. The image read-out device 84 is capable of reading out the image data that has been cumulatively memorized in the electronic cassette 12 (30). Herein, the electronic cassette 12 (30) and the image read-out device 84 respectively correspond to electronic apparatuses relating to the present invention.

Figure 2A:
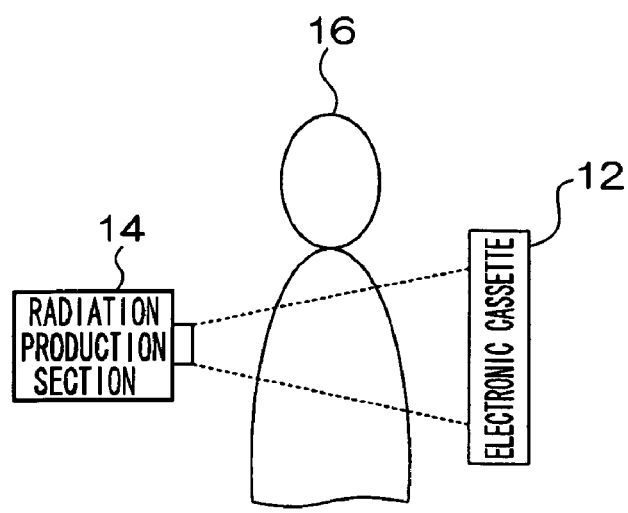
FIG. 2A is a schematic view showing an arrangement of the electronic cassette during radiation image photography.

As shown in FIG. 2A, at a time of photography of a radiographic image, the electronic cassette 12 is disposed spaced apart from a radiation production section 14 that produces radiation such as X-rays or the like. A photography position for a subject 16 to be disposed in is formed between the radiation production section 14 and the electronic cassette 12 at this time. When photography of a radiographic image is instructed, the radiation production section 14 emits radiation in a radiation amount corresponding to photography conditions and the like. The radiation emitted from the radiation production section 14 passes through the subject 16 disposed at the photography position and, carrying image information, is irradiated onto the electronic cassette 12.

Figure 2B:
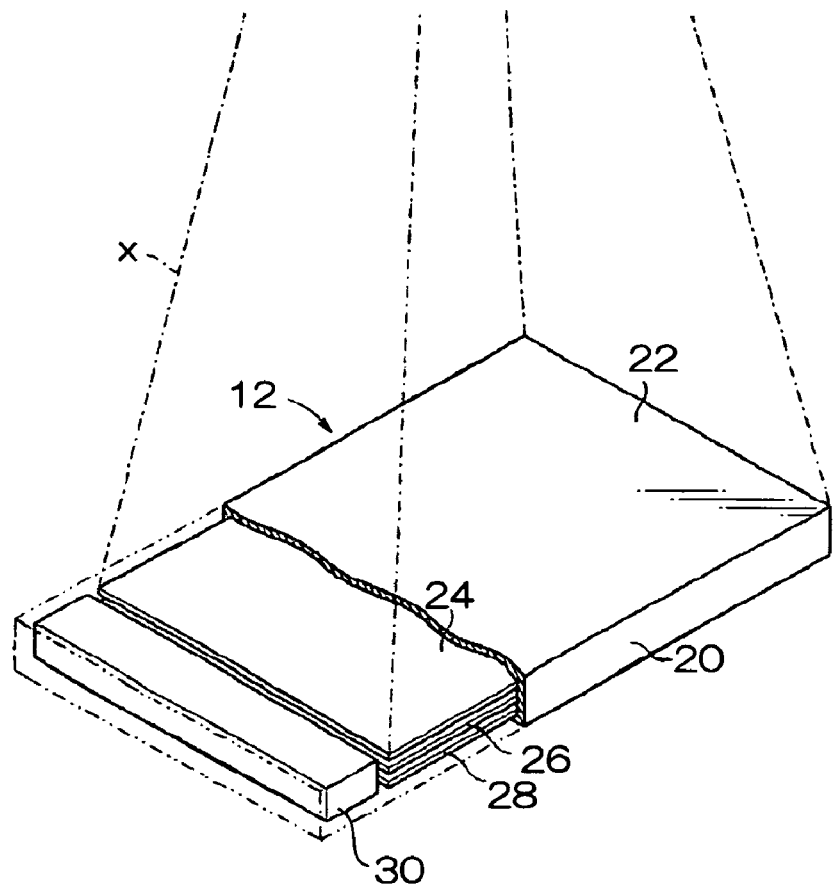
FIG. 2B is a perspective view showing internal structure of the electronic cassette.

As shown in FIG. 2B, the electronic cassette 12 is covered by a housing which includes a flat plate-form casing (casing body) 20 that has some thickness and is formed of a material that transmits radiation X. Inside the casing 20, a grid 24, a radiation detector (radiographic detection panel) 26 and a lead plate 28 are arranged to the interior of the casing 20 in this order from the side of an irradiation surface 22 onto which the radiation X is irradiated. The grid 24 eliminates scattered rays of the radiation X that are generated as the radiation X passes through the subject 16. The radiation detector 26 detects the radiation X. The lead plate 28 absorbs back-scattered rays of the radiation X. Here, the irradiation surface 22 of the casing 20 may be structured by the grid 24. A case 30 that accommodates various circuitry including a microcomputer (to be described later) is disposed at one end of the interior of the casing 20. In order to prevent the various circuits accommodated inside the case 30 being damaged in accordance with the irradiation of the radiation X, it is desirable for lead plating or the like to be disposed at the irradiation surface 22 side of the case 30.

The radiation detector 26 of the electronic cassette 12 is structured by an optoelectronic conversion layer, which absorbs radiation and converts the same to electric charges, being stacked on a TFT active matrix substrate 32, which is shown in FIG. 1. The optoelectronic conversion layer is formed of, for example, noncrystalline a-Se (amorphous selenium) of which selenium is a principal component (for example, a proportional content of at least 50%). When radiation is irradiated thereon, electric charges (electron-hole pairs) with a charge amount corresponding to the irradiated radiation amount are generated thereinside. Thus, the irradiated radiation is converted to electric charges. Cumulative capacitors 34, which accumulate the charges generated in the optoelectronic conversion layer, and pixel portions 40, which are provided with TFTs 36 for read-out of the charges accumulated in the cumulative capacitors 34, are numerously provided in a matrix form on the TFT active matrix substrate 32 (the optoelectronic conversion layer corresponding with each of pixel portions 48 is schematically shown as an optoelectronic conversion portion 38 in FIG. 1). The charges that are generated in the optoelectronic conversion layer in accordance with irradiation of radiation onto the electronic cassette 12 are accumulated in the individual cumulative capacitors 34 of the pixel portions 40. Thus, the image information carried by the radiation irradiated onto the electronic cassette 12 is converted to electric charge information and retained in the radiation detector 26.

Plural gate lines 42 and plural data lines 44 are provided in the TFT active matrix substrate 32. The gate lines 42 extend in a certain direction (a column direction) and are for turning the TFTs 36 of the pixel portions 40 on and off. The data lines 44 are provided in a direction crossing the gate lines 42 (a row direction) and are for reading out the accumulated charges from the cumulative capacitors 34 via the TFTs 36 that have been turned on. The respective gate lines 42 are connected to a gate line driver 46, and the respective data lines 44 are connected to a signal processing section 48. When charges are accumulated in the cumulative capacitors 34 of the pixel portions 40, the TFTs 36 of the pixel portions 40 are turned on sequentially, column by column, by signals provided through the gate lines 42 from the gate line driver 46. The charges accumulated in the cumulative capacitors 34 of the pixel portions 40 for which the TFTs 36 have been turned on are propagated through the data lines 44 as charge signals and inputted to the signal processing section 48. Thus, the charges accumulated in the cumulative capacitors 34 of the pixel portions 40 are sequentially read out in column units.

Although not illustrated in the drawings, the signal processing section 48 is provided with amplifiers and sample and hold circuits, which are provided for each of the data lines 44. The charge signals propagated through the respective data lines 44 are amplified by the amplifiers and then retained in the sample and hold circuits. A multiplexer and an A/D converter are connected, in this order, to the output sides of the sample and hold circuits. The charges retained by the individual sample and hold circuits are sequentially (serially) inputted into the multiplexer and converted to digital image data by the A/D converter. An image memory 50 is connected to the signal processing section 48, and the data outputted from the A/D convertor of the signal processing section 48 is sequentially stored in the image memory 50. The image memory 50 has a storage capacity to be capable of storing image data corresponding to a plurality of frames. Each time photography of a radiation image is carried out, the image data obtained by the photography is sequentially stored in the image memory 50.

Figure 3A:
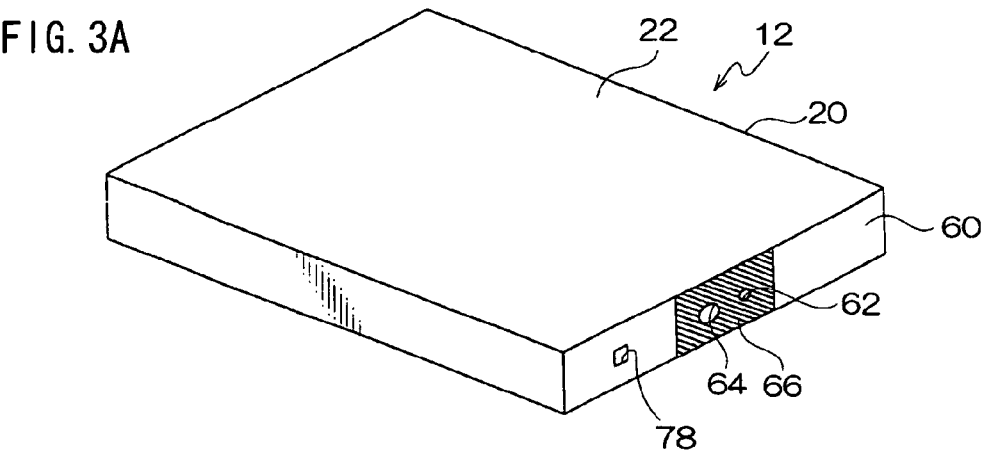
FIG. 3A is a perspective view showing the exterior of the electronic cassette.

The electronic cassette 12 is further provided with an LD (laser diode) 52, which features functionality for implementing wireless communications by laser light between the electronic cassette 12 and the image read-out device 84 and serves as a laser light source, and a PD (photodiode) 56 which detects laser light inputted from outside. In order to increase the rate of communications between the electronic cassette 12 and the image read-out device 84, it is preferable if the LD 52 is an LD that emits laser light with a wavelength in the infrared region and the PD 56 is a PD that has sensitivity to wavelengths in the infrared range. In the present exemplary embodiment, as shown in FIG. 3A, an emission hole 62 for passing laser light emitted from the LD 52 and a light reception hole 64 for passing laser light from the outside (for example, from the image read-out device 84) are respectively provided in a particular side face 60 of the casing 20 of the electronic cassette 12 (this side face is disposed so as to oppose the casing of the image read-out device 84 during communications with the image read-out device 84, and is hereinafter referred to as the opposing face 60). In FIG. 3A, a side face that borders a short side of the irradiation surface 22 is used as the opposing face 60 in which the emission hole 62 and the light reception hole 64 are provided, but the opposing face 60 is not limited thus and may be a side face that borders a long side of the irradiation surface 22, or may be a bottom face (a face at the opposite side from the irradiation surface 22) or the like.

The laser light emitted from the LD 52 passes through a lens 54 disposed at the laser light emission side of the LD 52 (see FIG. 1), passes through the emission hole 62, and is emitted to outside the casing 20. Laser light from the outside passes through the light reception hole 64, passes through a lens 58 disposed at the light incidence side of the PD 56 (see FIG. 1) and is detected by the PD 56. A partial region of the opposing face 60 of the casing 20 of the electronic cassette 12, including surroundings of the light reception hole 64 (and the emission hole 62), is covered with a diffusion member 66, which is capable of diffusing reflections of emitted laser light by reflecting the emitted laser light in each of plural directions which are different from one another. Instead of the diffusion member 66, this partial region may be covered with an absorption member that absorbs most of the emitted laser light (for example, a bristly member, a porous material, a member with a black surface or the like). With a view to raising the rate of communications with the image read-out device 84, it is desirable for the laser light used in communications to be non-visible laser light with a wavelength outside the visible region (for example, infrared laser light). In such a case, the above partial region may be covered with a light-emitting member that, when non-visible light is illuminated thereon, emits a fraction of the illumination as light in the visible region.

As the diffusion member 66, a member may be employed whose surface is molded such that, for example, within each of microscopic regions with areas smaller than an illumination region when the laser light emitted from the image read-out device 84 (to be described later) is illuminated, there are plural portions with mutually different directions of reflection of illuminated light. Accordingly, reflections of laser light illuminated thereon may be reliably scattered. It is most desirable if the diffusion member 66 is a member of which the surface is molded such that hemispherical protrusions with a size of not more than about $\frac{1}{10}$ of the wavelength of the illuminated laser light are uniformly distributed over the surface. If, as described above, the individual protrusions have hemispherical shapes, incidence angle dependency may be reduced, and if the sizes of the individual protrusions are less than about $\frac{1}{10}$ of the wavelength of the laser light, Rayleigh scattering regions are formed and the illuminated laser light may be more thoroughly scattered.

The LD 52 is connected to a communication control section 72 via a modulation section 68. The communication control section 72 is realized by a microcomputer. During transmissions of information to the image read-out device 84, the communication control section 72 outputs information of a transmission subject to the modulation section 68, and the communication control section 72 instructs the modulation section 68 of intensities of the laser light to be emitted from the LD 52. The modulation section 68 modulates the laser light to be emitted from the LD 52 with a predetermined modulation system in accordance with the inputted transmission subject information, and controls driving of the LD 52 such that intensities of the laser light emitted from the LD 52 match the instructed intensities. Thus, laser light that is modulated in accordance with the transmission subject information is emitted from the LD 52 with the intensities instructed by the communication control section 72.

The PD 56 is connected to the communication control section 72 via a demodulation section 70. When laser light from outside is detected by the PD 56 and received light amount signals corresponding to received amounts of the laser light are inputted from the PD 56, the demodulation section 70 demodulates information carried by the received laser light (information transmitted from a communication partner device) with a predetermined demodulation system on the basis of the inputted received light amount signals, and outputs the demodulated information to the communication control section 72. The communication control section 72 performs data transfer processing (FIG. 5), which will be described later.

The PD 56 is also connected to a received light amount detection section 74, via the demodulation section 70. As one mode of detection of a reception condition, the received light amount detection section 74 detects an amount of laser light received by the PD 56. Results of detection of received amounts of laser light are outputted to a later-described position change monitoring section 80.

A distance sensor 76 is provided in the electronic cassette 12. In the present exemplary embodiment, a structure that is employed as the distance sensor 76 is provided with a light-emitting element and a light-detecting element, measures a duration from light being emitted from the light-emitting element until the emitted light is reflected by an object and detected by the light-detecting element, and detects a distance from the object in accordance with the measured duration. As shown in FIG. 3A, a detection hole 78 is provided in the opposing face 60 of the casing 20 of the electronic cassette 12. The light emitted from the light-emitting element of the distance sensor 76 passes through the detection hole 78, is illuminated onto an object that is disposed forward of the opposing face 60, is reflected by the object, passes through the detection hole 78, and is detected by the light-detecting element.

The communication control section 72, the received light amount detection section 74 and the distance sensor 76 are connected to the position change monitoring section 80. The position change monitoring section 80 too is realized by the microcomputer. As will be described in more detail later, during communications between a device (the electronic cassette 12) and the image read-out device 84 as a partner device, the position change monitoring section 80 monitors light amounts of laser light detected by the received light amount detection section 74 and changes in distance detected by the distance sensor 76, or the like. Thus, the position change monitoring section 80 implements position change monitoring processing (FIG. 6), which monitors for a change in the relative positions of the device (the electronic cassette 12) and the image read-out device 84.

The electronic cassette 12 is further provided with a power supply section 82. The above-described various circuits and elements (a microcomputer that functions as the gate line driver 46, the signal processing section 48, the image memory 50, the communication control section 72 and the position change monitoring section 80, and the modulation section 68, the LD 52, the demodulation section 70, the distance sensor 76 and the like) operate with electric power provided from the power supply section 82. A structure that is excellent as the power supply section 82 incorporates a battery (a chargeable secondary battery) so as not to impede portability of the electronic cassette 12 and provides power from the charged battery to the various circuits and elements. Alternatively, a primary battery may be used as the battery, or a structure is possible that is continuously connected to a commercial power supply, rectifies and transforms the electric power provided from the commercial power supply, and provides the power to the various circuits and elements.

Figure 3B:
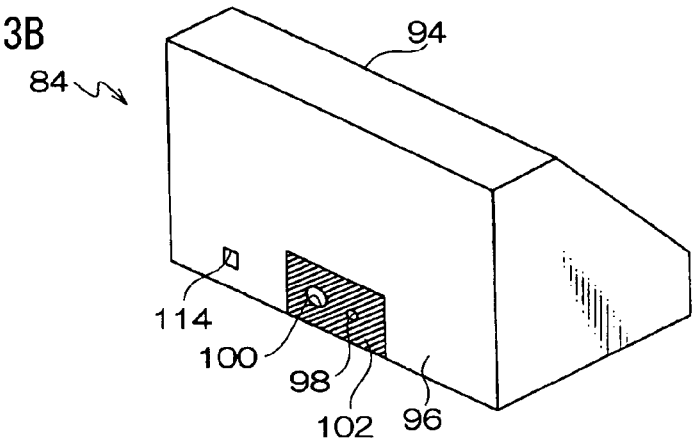
FIG. 3B is a perspective view showing the exterior of the image read-out device.

Meanwhile, the image read-out device 84 also features functionality for performing wireless communications, with the electronic cassette 12, with laser light and is equipped with an LD 86 that serves as a laser light source and a PD 90 that detects laser light that is incident from thereoutside. In order to raise a speed of communications between the electronic cassette 12 and the image read-out device 84, similarly to the electronic cassette 12, it is preferable if the LD 86 is an LD that emits laser light with a wavelength in the infrared range and the PD 90 is a PD that has sensitivity to wavelengths in the infrared range. In the present exemplary embodiment, as shown in FIG. 3B, an emission hole 98 for passing laser light emitted from the LD 86 and a light reception hole 100 for passing laser light from the outside (for example, from the electronic cassette 12) are respectively provided in a particular side face 96 of a casing 94 that covers an external portion of the image read-out device 84 (this side face is disposed so as to oppose the casing of the electronic cassette 12 during communications with the electronic cassette 12, and is hereinafter referred to as the opposing face 96). The emission hole 98 and light reception hole 100 provided in the opposing face 96 are set with a spacing and heights from a bottom face of the casing 94 that are substantially equal to a spacing and heights from the bottom face of the casing 20 of the emission hole 62 and light reception hole 64 provided in the opposing face 60 of the casing 20 of the electronic cassette 12. Thus, in a state in which the opposing face 60 of the electronic cassette 12 and the opposing face 96 of the image read-out device 84 are lined up (the state shown in FIG. 3C), the emission hole 98 and light reception hole 100 are disposed such that the light reception hole 100 opposes the emission hole 62 and the emission hole 98 opposes the light reception hole 64.

The laser light emitted from the LD 86 passes through a lens 88 disposed at the laser light emission side of the LD 86 (see FIG. 1), passes through the emission hole 98 and is emitted to outside the casing 94. Laser light from the outside passes through the light reception hole 100, passes through a lens 92 disposed at the light incidence side of the PD 90 (see FIG. 1) and is detected by the PD 90. Similarly to the electronic cassette 12, a partial region of the opposing face 96 of the casing 94 of the image read-out device 84, including surroundings of the light reception hole 100 (and the emission hole 98), is covered with a diffusion member 102. Instead of the diffusion member 102, the earlier-described absorption member, light-emitting member or the like may be provided.

The LD 86 is connected to a communication control section 108 via a modulation section 104. The communication control section 108 is realized by a microcomputer. During transmissions of information to the electronic cassette 12, the communication control section 108 outputs information of a transmission subject to the modulation section 104, and the communication control section 108 instructs the modulation section 104 with intensities of the laser light to be emitted from the LD 86. The modulation section 104 modulates the laser light to be emitted from the LD 86 with a predetermined modulation system in accordance with the inputted transmission subject information, and controls driving of the LD 86 such that the intensities of the laser light emitted from the LD 86 match the instructed intensities. Thus, laser light that is modulated in accordance with the transmission subject information is emitted from the LD 86 with the intensities instructed by the communication control section 108.

The PD 90 is connected to the communication control section 108 via a demodulation section 106. When laser light from outside is detected by the PD 90 and received light amount signals corresponding to received amounts of the laser light are inputted from the PD 90, the demodulation section 106 demodulates information carried by the received laser light (information transmitted from a communication partner device) with a predetermined demodulation system on the basis of the inputted received light amount signals, and outputs the demodulated information to the communication control section 108. The communication control section 108 performs data read-out processing (FIGS. 4A and 4B), which will be described later.

The PD 90 is also connected to a received light amount detection section 110, via the demodulation section 106. The received light amount detection section 110 detects an amount of laser light received by the PD 90. Results of detection of received amounts of laser light are outputted to a later-described position change monitoring section 116.

A distance sensor 112 is provided in the image read-out device 84 too. In the present exemplary embodiment, a structure that is employed as the distance sensor 112, similarly to the earlier-described distance sensor 76, detects a distance from an object on the basis of a duration from light being emitted from a light-emitting element until the emitted light is reflected by the object and detected by a light-detecting element. As shown in FIG. 3B, a detection hole 114 is provided in the opposing face 96 of the casing 94 of the image read-out device 84. The light emitted from the light-emitting element of the distance sensor 112 passes through the detection hole 114, is illuminated onto an object that is disposed forward of the opposing face 96, is reflected by the object, passes through the detection hole 114, and is detected by the light-detecting element. The communication control section 108, the received light amount detection section 110 and the distance sensor 112 are connected to the position change monitoring section 116. The position change monitoring section 116 too is realized by a microcomputer. As will be described in more detail later, the position change monitoring section 116 implements position change monitoring processing (FIG. 6) in the same way as the position change monitoring section 80 of the electronic cassette 12.

Figure 3C:
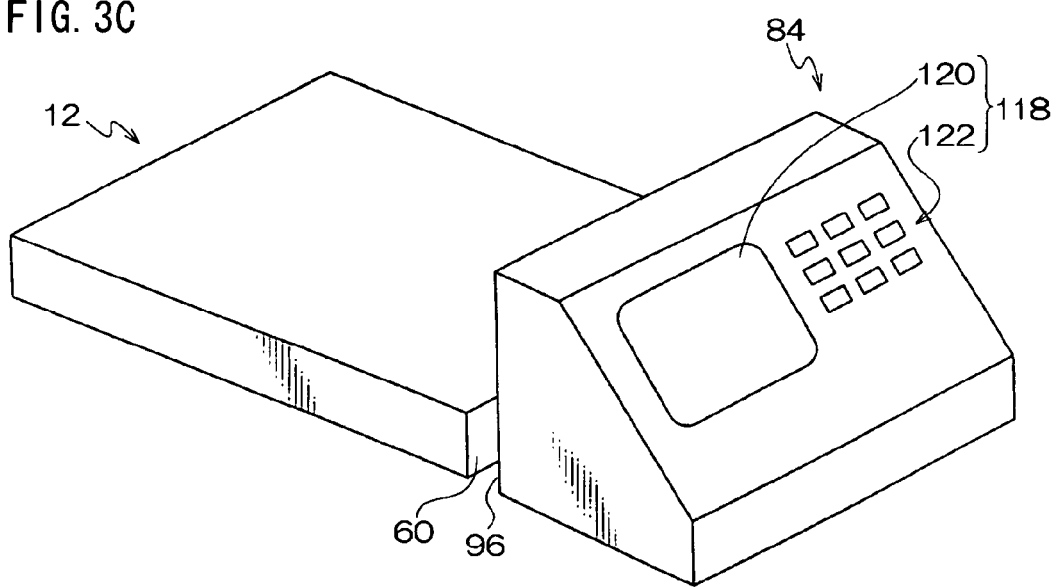
FIG. 3C is a perspective view showing an arrangement of the electronic cassette and the image read-out device during image read-out from the electronic cassette.

An operation section 118 is connected to the communication control section 108. As shown in FIG. 3C, the operation section 118 is structured to include a display 120 and a keyboard 122. The display 120 is provided in the casing 94 and is capable of displaying arbitrary information, including various messages. The keyboard 122 is similarly provided in the casing 94 and is equipped with plural keys. Various instructions and information that are inputted by a user operating the keyboard 122 are inputted to the communication control section 108, and displays of information on the display 120 are controlled by the communication control section 108.

An image memory 126 is connected to the communication control section 108 via an image processing section 124. In communications between the electronic cassette 12 and the image read-out device 84, as will be described later, image data that has been cumulatively stored in the image memory 50 of the electronic cassette 12 is transferred to the image read-out device 84, and the image processing section 124 carries out various kinds of image processing on image data that has been received from the electronic cassette 12 and sequentially outputted from the communication control section 108 (for example, various kinds of correction processing that remove noise superimposed on the image data, correct variations in pixels of the image data which are caused by variations in the characteristics of the respective pixel portions 40 of the radiation detector 26, and the like). The image data to which the various kinds of image processing have been applied is stored in the image memory 126.

An output control section 128 is connected to the image memory 126. When the image data stored in the image memory 126 is to be outputted to an external apparatus, the output control section 128 controls reading-out of the image data from the image memory 126 and output of the image data to the external apparatus. FIG. 1 shows a display 130, as a typical example of an external apparatus. In a case in which the external apparatus is the display 130, an image represented by the image data stored in the image memory 126 (a radiographic image) is displayed at the display 130 by the output control section 128. Besides the display 130, for example, the following can be mentioned as external apparatuses: a printing device that prints an image represented by the image data onto a sheet-form printing medium, an information recording device that records the image data onto a CD-R or other publicly known information recording medium, a communications device that transmits the image data to an information processing device through a communications network, and so forth.

A power supply section of the image read-out device 84 is not illustrated in FIG. 1, but such a power supply section has a structure which is continuously connected to a commercial power supply, rectifies and transforms electric power provided from the commercial power supply, and provides the electric power to various circuits and elements within the image read-out device 84.

Next, as operations of the present exemplary embodiment, communication between the electronic cassette 12 and the image read-out device 84 will be described. When a use of image data that has been stored in the image memory 50 of the electronic cassette 12 by photography of a radiographic image being carried out is required, such as display as an image at the display 130 or the like, a user disposes the electronic cassette 12 such that the opposing face 60 lines up with the opposing face 96 of the image read-out device 84 (as in the state shown in FIG. 3C), for the image data to be read out from the electronic cassette 12 by the image read-out device 84. Then, the user finely adjusts respective positions of alignment of end faces and the like, and thereafter operates the keyboard 122 of the image read-out device 84 to instruct a read-out of image data from the electronic cassette 12.

Figure 4A:
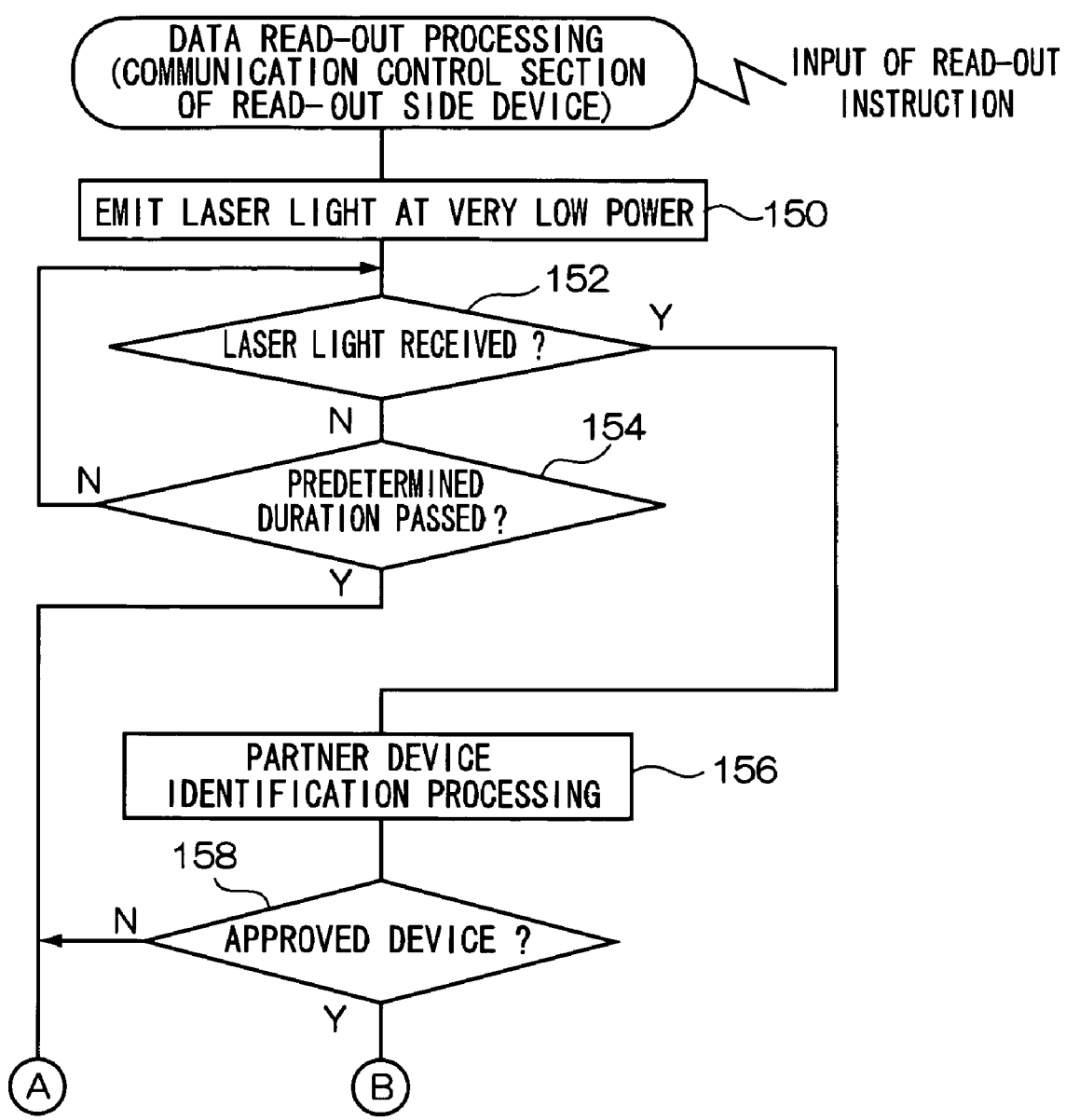
FIG. 4A is a flowchart showing details of data read-out processing.

At the communication control section 108 of the image read-out device 84, when the above operation is implemented by the user and a read-out of image data from the electronic cassette 12 is instructed, the data read-out processing illustrated in FIGS. 4A and 4B is carried out. In this data read-out processing, firstly, in step 150, very low power laser light is emitted from the LD 86, via the modulation section 104. Then, in step 152, the PD 90 judges whether or not laser light has been detected. If this judgement is negative, the processing advances to step 154, and it is judged whether or not a predetermined duration has passed from the emission of laser light being commenced. If this judgement is negative, the processing returns to step 152, and steps 152 and 154 are repeated until either of the judgements is positive.

The very low power laser light emitted from the LD 86 passes through the emission hole 98 and is emitted out of the casing 94 of the image read-out device 84. When this laser light passes through the light reception hole 64, is incident into the casing 20 of the electronic cassette 12, and is detected (sensed) by the PD 56, very low power laser light is emitted from the LD 52 of the electronic cassette 12, as will be described later. This laser light is received by the PD 90. Therefore, if the predetermined duration from the emission of laser light from the LD 86 being commenced passes without laser light being received by the PD 90 and the judgement of step 154 is positive, it is determined that the relative positions of the electronic cassette 12 and the image read-out device 84 are offset from a communication-possible positional relationship (positions at which the electronic cassette 12 and image read-out device 84 can each receive laser light emitted from the other device), and that it is necessary to adjust the relative positions.

Accordingly, if the judgement of step 154 is positive, in step 190, the emissions of laser light from the LD 86 are stopped. Then, in step 192, the user is prompted to carry out a relative position adjustment operation, by an error message requesting adjustment of the relative positions being displayed at the display 120 or the like, after which the data read-out processing (FIGS. 4A and 4B) ends. Here, if the relative positions of the electronic cassette 12 and the image read-out device 84 are greatly offset from the communication-possible positional relationship, it is possible that the laser light emitted from the image read-out device 84 will leak out from the gap between the opposing face 60 of the electronic cassette 12 and the opposing face 96 of the image read-out device 84. However, because the laser light emitted from the LD 86 of the image read-out device 84 at this time has a very small light amount (light intensity), this will not cause problems.

Figure 5:
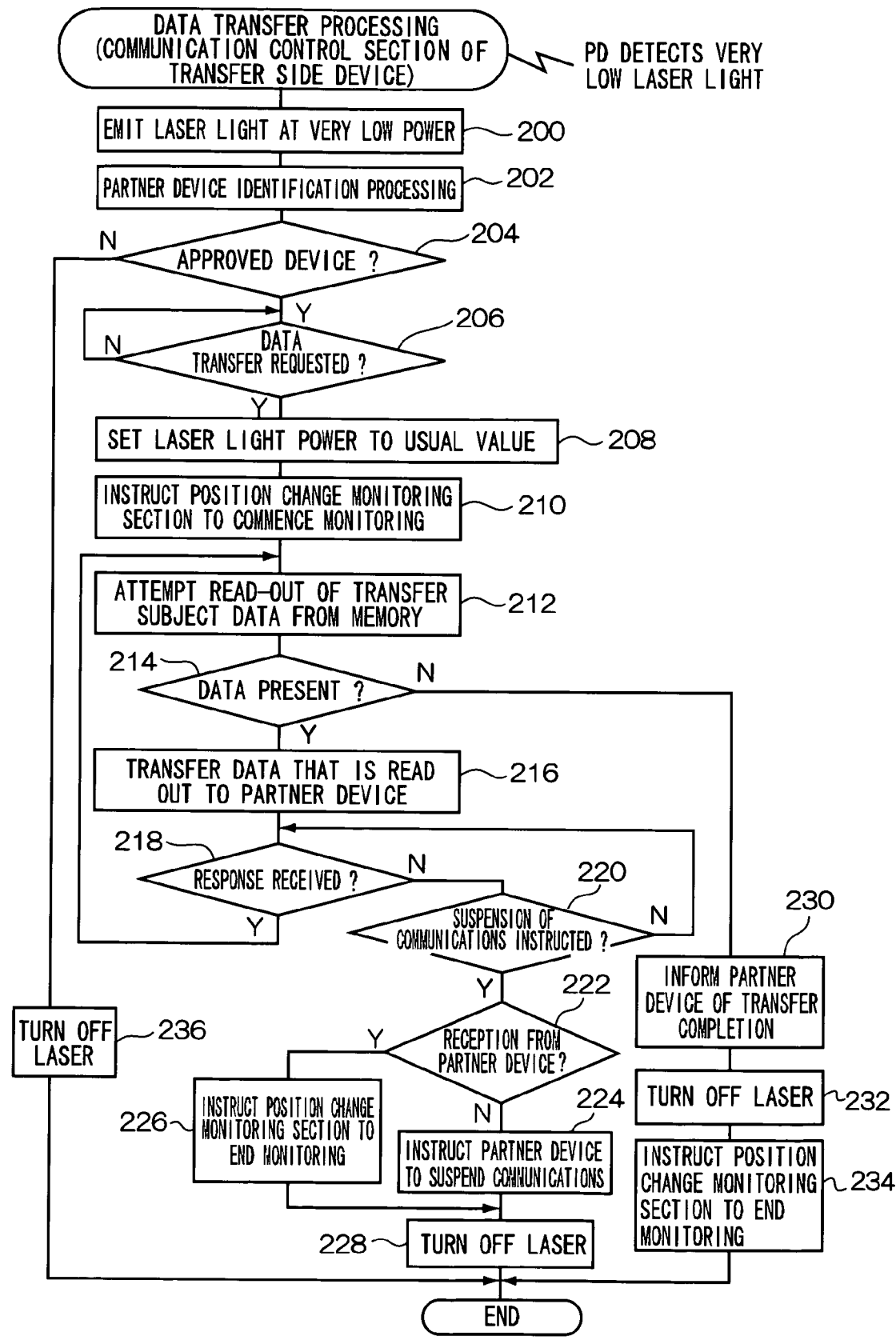
FIG. 5 is a flowchart showing details of data transfer processing.

On the other hand, if the relative positions of the electronic cassette 12 and the image read-out device 84 are in the communication-possible positional relationship, then when the very low power laser light emitted from the image read-out device 84 is detected (sensed) by the PD 56 of the electronic cassette 12, the detection of the laser light by the PD 56 acts as a trigger for the data transfer processing shown in FIG. 5 to be carried out by the communication control section 72 of the electronic cassette 12. In this data transfer processing, firstly, in step 200, a very low power laser light is emitted from the LD 52, via the modulation section 68. The very low power laser light emitted from the LD 52 passes through the emission hole 62 and is emitted out of the casing 20 of the electronic cassette 12. If this laser light passes through the light reception hole 100, is incident into the casing 94 of the image read-out device 84, and is detected (sensed) by the PD 90, the judgement of step 152 of the data read-out processing (FIG. 4A) is positive, and the processing advances to step 156.

When the judgement of step 152 is positive, the very low power laser light emitted from the LD 86 of the image read-out device 84 is detected (sensed) by the PD 56 of the electronic cassette 12 and the very low power laser light emitted from the LD 52 of the electronic cassette 12 is detected (sensed) by the PD 90 of the image read-out device 84. Thus, it can be determined that the relative positions of the electronic cassette 12 and the image read-out device 84 are in an optimum positional relationship in which communication is possible, in which laser light emitted from the LD 86 is incident on the center of a light-receiving surface of the PD 56 or in the vicinity thereof and laser light emitted from the LD 52 is incident on the center of a light-receiving surface of the PD 90 or in the vicinity thereof.

Then, in step 156 of the data read-out processing (FIG. 4A) and step 202 of the data transfer processing (FIG. 5), predetermined information is transferred from each device by laser light (laser light emitted from the LD of the device being modulated in accordance with the predetermined information), and information received from each partner device by laser light (information obtained by demodulating the laser light emitted from the LD of the partner device and received by the PD of the device) is checked. Thus, partner device identification processing is carried out, which identifies whether or not the partner device is an approved device. As the information that is transmitted by the electronic cassette 12 to the image read-out device 84 for the partner device identification processing, information such as a cassette ID for identifying the individual electronic cassette 12 and the like can be mentioned, and as information that is sent by the image read-out device 84 to the electronic cassette 12, information indicating that the device is an image read-out device and the like can be mentioned.

Next, in step 158 of the data read-out processing (FIG. 4A), it is judged whether or not the partner device is an approved device. Then, if this judgement is negative, emissions of laser light from the LD 86 are stopped in step 190, and then, in step 192, error processing is carried out, such as an error message giving notice that the partner device is not an approved device being displayed at the display 120 or the like, and the data read-out processing (FIGS. 4A and 4B) ends. In the data transfer processing (FIG. 5) too, it is next judged in step 204 whether or not the partner device is an approved device. If this judgement is negative, emissions of laser light from the LD 52 are stopped in step 236 and the data transfer processing (FIG. 5) ends.

If, in the data read-out processing (FIGS. 4A and 4B), it is judged that the partner device is an approved device (the electronic cassette 12), the judgement of step 158 is positive, the processing advances to step 160, and the power of the laser light from the LD 86 is set to a value for usual times of communication. Then, in step 162, information requesting a data transfer from the partner device is transmitted to the partner device by laser light. In step 164, the position change monitoring section 116 is instructed to commence execution of the position change monitoring processing (FIG. 6). The position change monitoring processing will be described hereafter. In step 166, it is judged whether or not data transferred from the partner device is being received. If this judgement is negative, the processing advances to step 168, and it is judged whether or not the partner device has given notice of completion of the data transfer. If this judgement is also negative, the processing advances to step 170, and it is judged whether or not a suspension of communications with the partner device has been instructed by the position change monitoring section 116. If this judgement is negative, the processing returns to step 166, and steps 166 to 170 are repeated until any of these judgements is positive.

Meanwhile, in the data transfer processing (FIG. 5), if it has been judged that the partner device is an approved device (the image read-out device 84), the judgement of step 204 is positive, the processing advances to step 206, and it is judged whether or not information requesting a data transfer has been received from the partner device. Step 206 is repeated until this judgement is positive. When the processing of step 162 of FIG. 4B is executed by the image read-out device 84 and information requesting a data transfer is received, the judgement of step 206 is positive, the processing advances to step 208, and the laser light power from the LD 52 is set to a value for usual times of communication. In step 210, the position change monitoring section 80 is instructed to commence execution of position change monitoring processing (FIG. 6). Then, in step 212, reading-out from the image memory 50 of image data that is a transfer subject to be transferred to the image read-out device 84 is attempted.

Then, in step 214, it is judged whether or not transfer subject image data (image data that has not been transferred to the image read-out device 84) is stored in the image memory 50. If this judgement is positive, the processing advances to step 216, and the transfer subject image data that has been successfully read out from the image memory 50 is transmitted to the partner device (the image read-out device 84) by laser light. In step 218, it is judged whether or not a response has been received from the image read-out device 84. If this judgement is negative, the processing advances to step 220, and it is judged whether or not a suspension of communications with the partner device has been instructed by the position change monitoring section 80. If this judgement is negative, the processing returns to step 218. Steps 218 and 220 are repeated until either of the judgements is positive.

When the image data is transferred from the electronic cassette 12 by laser light as described above and the image data is received by the image read-out device 84, the judgement of step 166 of the data read-out processing (FIG. 4B) is positive, the processing advances to step 172, and the image data received from the partner device (the electronic cassette 12) is outputted to a succeeding stage (in the present exemplary embodiment, the image processing section 124). Hence, the image data received by the image read-out device 84 is subjected to various kinds of image processing by the image processing section 124 and then stored in the image memory 126. Next, in step 174, a response to the data transmission of the partner device (the electronic cassette 12) is transmitted by laser light, and the processing returns to step 166. When this response is received by the partner device (the electronic cassette 12), the judgement of step 218 of the data transfer processing (FIG. 5) is positive, and the processing returns to step 212. Thus, as long as transfer subject image data is stored in the image memory 50 of the electronic cassette 12, the transfer of image data to the image read-out device 84 is continued by steps 166 to 174 of the data read-out processing (FIG. 4B) being repeated and steps 212 to 220 of the data transfer processing (FIG. 5) being repeated.

Then, when all the image data stored in the image memory 50 has been transferred to the image read-out device 84, the judgement of step 214 of the data transfer processing (FIG. 5) is negative, the processing advances to step 230, and the partner device (the image read-out device 84) is notified of the completion of data transfer by laser light. In step 232, emissions of laser light from the LD 52 are stopped. Then, in step 234, the position change monitoring section 80 is instructed to end the position change monitoring processing (FIG. 6), and the data transfer processing (FIG. 5) ends. In the data read-out processing (FIGS. 4A and 4B), when the completion of data transfer is notified from the electronic cassette 12, the judgement of step 168 is positive, the processing advances to step 176, and emissions of laser light from the LD 86 are stopped. Then, in step 178, the position change monitoring section 116 is instructed to end the position change monitoring processing (FIG. 6), and the data read-out processing (FIGS. 4A and 4B) ends.

Next, the position change monitoring processing that is executed by both the position change monitoring section 80 of the electronic cassette 12 and the position change monitoring section 116 of the image read-out device 84 will be described. As has already been described, communications between the electronic cassette 12 and the image read-out device 84 are commenced in a state in which the relative positions of the electronic cassette 12 and the image read-out device 84 have been adjusted to the communication-possible positional relationship (the state shown in FIG. 3C). However, if, for example, a pushing force, a vibration or the like acts on one or both of the casing 20 of the electronic cassette 12 and the casing 94 of the image read-out device 84, or the like, the relative positions may be offset from the communication-possible positional relationship during communications. In such a case, the laser light emitted from the electronic cassette 12 and/or the image read-out device 84 may leak out from the gap between the opposing face 60 of the electronic cassette 12 and the opposing face 96 of the image read-out device 84, which is not desirable. Therefore, the position change monitoring sections 80 and 116 commence execution of the position change monitoring processing in accordance with instructions from the communication control section of each device when communications between the electronic cassette 12 and image read-out device 84 are commenced, continue execution of the position change monitoring processing while communications between the electronic cassette 12 and the image read-out device 84 are being performed, and monitor changes of the relative positions of the electronic cassette 12 and the image read-out device 84.

That is, as shown in FIG. 6, in the position change monitoring processing, firstly, in step 250, a received amount of laser light at the PD that is detected by the received light amount detection section of the device (a received laser light amount detection value P) is acquired at a point in time at which the PD receives laser light immediately after data transfer commences. Because this is a time just after the relative positions of the electronic cassette 12 and the image read-out device 84 have been adjusted to the communication-possible positional relationship, the received laser light amount detection value P acquired in step 250 represents a received light amount of laser light at the PD in the state in which the relative positions of the electronic cassette 12 and the image read-out device 84 are adjusted to the communication-possible positional relationship. Herein, as the received laser light amount detection value P, any of the following may be employed: a maximum value or average value of received light amounts of the laser light over a period in which the PD receives the laser light, and a received light amount value at which a cumulative frequency from the maximum value or minimum value in a histogram of received light amounts of the laser light reaches a predetermined value. A different value may be used, provided it is a value that represents a received laser light amount at the PD in the state in which the relative positions of the electronic cassette 12 and the image read-out device 84 are adjusted to the communication-possible positional relationship. Then, in step 252, the received laser light amount detection value P acquired in step 250 is stored in a built-in memory to serve as a reference value Pref of received laser light amounts at the PD (see FIG. 7A).

In step 254, a distance away of the partner device (a distance detection value L), which is detected by the distance sensor provided at the device, is acquired from the distance sensor. This distance detection value L represents a distance of the casing of the partner device from a position at which the distance sensor is disposed in the state in which the relative positions of the electronic cassette 12 and the image read-out device 84 are adjusted to the communication-possible positional relationship. Then, in step 256, the distance detection value L acquired in step 254 is stored in the built-in memory or the like to serve as a reference value Lref of distances from the partner device (see FIG. 8A).

Next, in step 258, a most recent received laser light amount at the PD (a received laser light amount detection value P), which is detected by the received light amount detection section of the device, is again acquired. Then, in step 260, it is judged whether or not the received laser light amount detection value P acquired in step 258 is less than a value for which a predetermined value $\beta$ is subtracted from the reference value Pref of received laser light amounts (i.e., $P \leq Pref - \beta$). Herein, the size of the predetermined value $\beta$ may be switched in accordance with which of the values exemplified above for the received laser light amount detection value P (a maximum value, a minimum value or the like) is being used. When this judgement is negative, it may be determined that a fall in received light amounts of laser light at the PD is within a tolerance range. Hence, the processing advances to step 262, and the distance away of the partner device (the distance detection value L), which is detected by the distance sensor of the device, is again acquired from the distance sensor. Then, in step 264, it is judged whether or not the distance detection value L acquired in step 262 is greater than a value for which a predetermined value α is added to the reference value Lref of distances of the partner device (i.e., L≧Lref+α). When the judgement of step 264 is negative, it may be determined that a change in the distance of the partner device from the position at which the distance sensor is disposed is within a tolerance range. Hence, the processing advances to step 266, and it is judged whether or not the communication control section of the device has instructed the position change monitoring processing to end. If this judgement is negative, the processing returns to step 258.

In this manner, steps 258 to 266 are repeated until the judgement of any of steps 260, 264 and 266 is positive, and changes in the received laser light amount detection value P and the distance detection value L are monitored for. While communications between the electronic cassette 12 and the image read-out device 84 are being carried out, if the relative positions of the electronic cassette 12 and the image read-out device 84 do not change or amounts of change in the relative positions are very small, the judgements of steps 260 and 264 will not be positive, and the position change monitoring processing will be instructed to end by the communication control section of the device. Thus, the judgement of step 266 is positive and the position change monitoring processing ends.

Figure 7A:
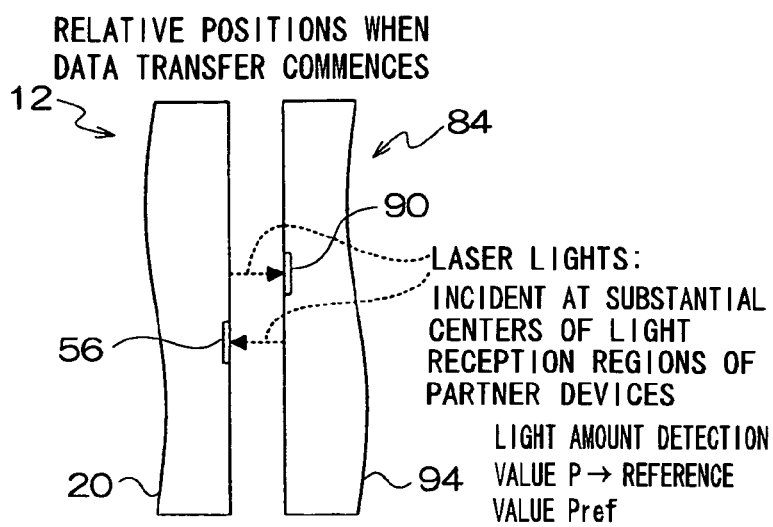
FIG. 7A, FIG. 7B and FIG. 7C are conceptual views for explaining detection of a change in position on the basis of received light amounts of laser light.
Figure 7B:
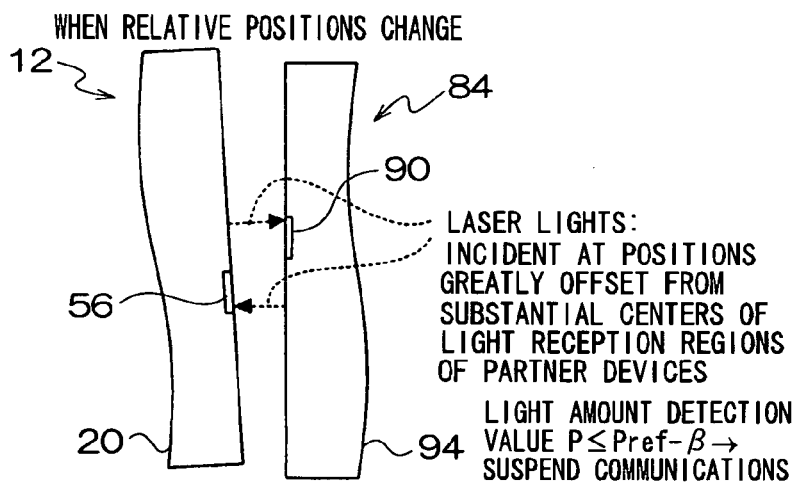

However, if the relative positions of the electronic cassette 12 and the image read-out device 84 change from the state shown in FIG. 7A to the state shown in FIG. 7B while communications between the electronic cassette 12 and image read-out device 84 are being carried out, by a pushing force, vibration or the like acting on one or both of the casing 20 of the electronic cassette 12 and the casing 94 of the image read-out device 84 or the like (that is, if a relatively large change in the relative positions occurs), then the laser light emitted from the electronic cassette 12 and/or the image read-out device 84 is significantly offset from the center of the light reception surface of the PD of the partner device, as shown in FIG. 7B. Thus, a possibility arises of the laser light leaking out from the gap between the opposing face 60 of the electronic cassette 12 and the opposing face 96 of the image read-out device 84.

Figure 7C:
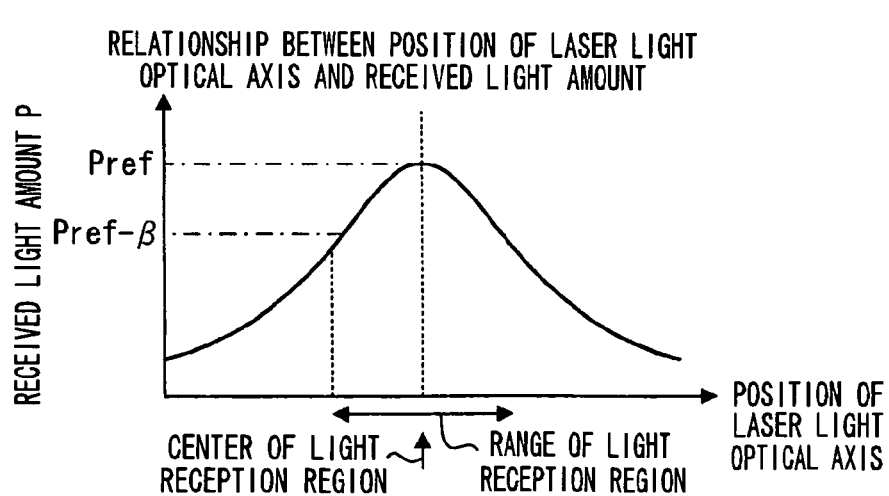

Correspondingly, the laser light reception amount of a PD changes as shown in FIG. 7C in response to the change of position of the optical axis of the laser light that is incident on the PD, and the received laser light amount at the PD is greatly attenuated when a deviation amount of the optical axis position of the laser light relative to a central position of a light reception region is large. If the relative positions of the electronic cassette 12 and the image read-out device 84 change relatively greatly, then the incidence position of the laser light on the PD of the electronic cassette 12 or the image read-out device 84 is greatly offset from the center of the light reception region, as shown in FIG. 7B, and the received laser light amount detection value P is greatly reduced. Hence, the judgement of the aforementioned step 260 is positive. Thus, by the received laser light amount detection value P being monitored, a change in the relative positions of the electronic cassette 12 and the image read-out device 84 that could lead to a leakage of laser light may be detected.

When the relative positions of the electronic cassette 12 and the image read-out device 84 are relatively greatly changed, the distance of the casing of the partner device from the position at which a distance sensor is disposed (the length of the arrow of a solid line shown in FIG. 8B) changes accordingly, and a distance detection value L, corresponding to, of the two solid arrows in the example in FIG. 8B, the solid arrow that is disposed further up in FIG. 8B, is greatly increased. Hence, the judgement of the aforementioned step 264 is positive. Thus, by the distance detection value L too being monitored, a change in the relative positions of the electronic cassette 12 and the image read-out device 84 that could lead to a leakage of laser light may be detected. When the judgement of step 260 or step 264 is positive, the processing advances to step 268, the communication control section of the device is instructed to suspend communications, and then the position change monitoring processing ends.

Now, when the position change monitoring section 116 of the image read-out device 84 instructs the communication control section 108 to suspend communications, the judgement of step 170 of the data read-out processing (FIG. 4B) is positive, the processing advances to step 180, and it is judged whether or not the suspension of communications has been instructed by the partner device. In this case, the source of the instruction to suspend communications is the position change monitoring section 116 of the device, so this judgement is negative, the processing advances to step 182, and the partner device (the electronic cassette 12) is instructed by laser light to suspend communications. In step 186, emissions of laser light from the LD 86 are stopped. Then, in step 188, error processing is carried out, displaying an error message giving notice of the suspension of communications together with the reason (that the casing has moved significantly) at the display 120, or the like, and the data read-out processing (FIGS. 4A and 4B) ends. At the electronic cassette 12, which has been instructed to suspend communications by the image read-out device 84, the judgement of step 220 of the data transfer processing (FIG. 5) is positive, the processing advances to step 222, and it is judged whether or not the suspension of communications has been instructed by the partner device. In this case, the judgement is positive, the processing advances to step 226, and the position change monitoring section 80 is instructed to end the position change monitoring processing (FIG. 6). Then, in step 228, emissions of laser light from the LD 52 are stopped, and the data transfer processing (FIG. 5) ends.

In a case in which the position change monitoring section 80 of the electronic cassette 12 instructs the communication control section 72 to suspend communications, the judgement of step 220 of the data transfer processing (FIG. 5) is positive and the judgement of step 222 is negative. The processing advances to step 224, and the partner device (the image read-out device 84) is instructed by laser light to suspend communications. In step 228, emissions of laser light from the LD 52 are stopped, and the data transfer processing (FIG. 5) ends. At the image read-out device 84, which has been instructed to suspend communications by the electronic cassette 12, in step 184, the position change monitoring section 116 is instructed to end the position change monitoring processing (FIG. 6). Then, emissions of laser light from the LD 86 are stopped in step 186, the above-described error processing is carried out in step 188, and the data read-out processing (FIGS. 4A and 4B) ends.

According to the processing described above, if a change in the relative positions of the electronic cassette 12 and the image read-out device 84 that may lead to a leakage of laser light is detected by either of the position change monitoring section 80 of the electronic cassette 12 and the position change monitoring section 116 of the image read-out device 84, emissions of laser light from the electronic cassette 12 and emissions of laser light from the image read-out device 84 are both stopped.

Second Exemplary Embodiment

Now, a second exemplary embodiment of the present invention will be described. Herein, portions that are the same as in the first exemplary embodiment are assigned the same reference numerals and will not be described. In the first exemplary embodiment, detection of a reception condition is implemented on the basis of received amounts of laser light; in the second exemplary embodiment, detection of a reception condition is implemented on the basis of error rates in received information.

Figure 9:
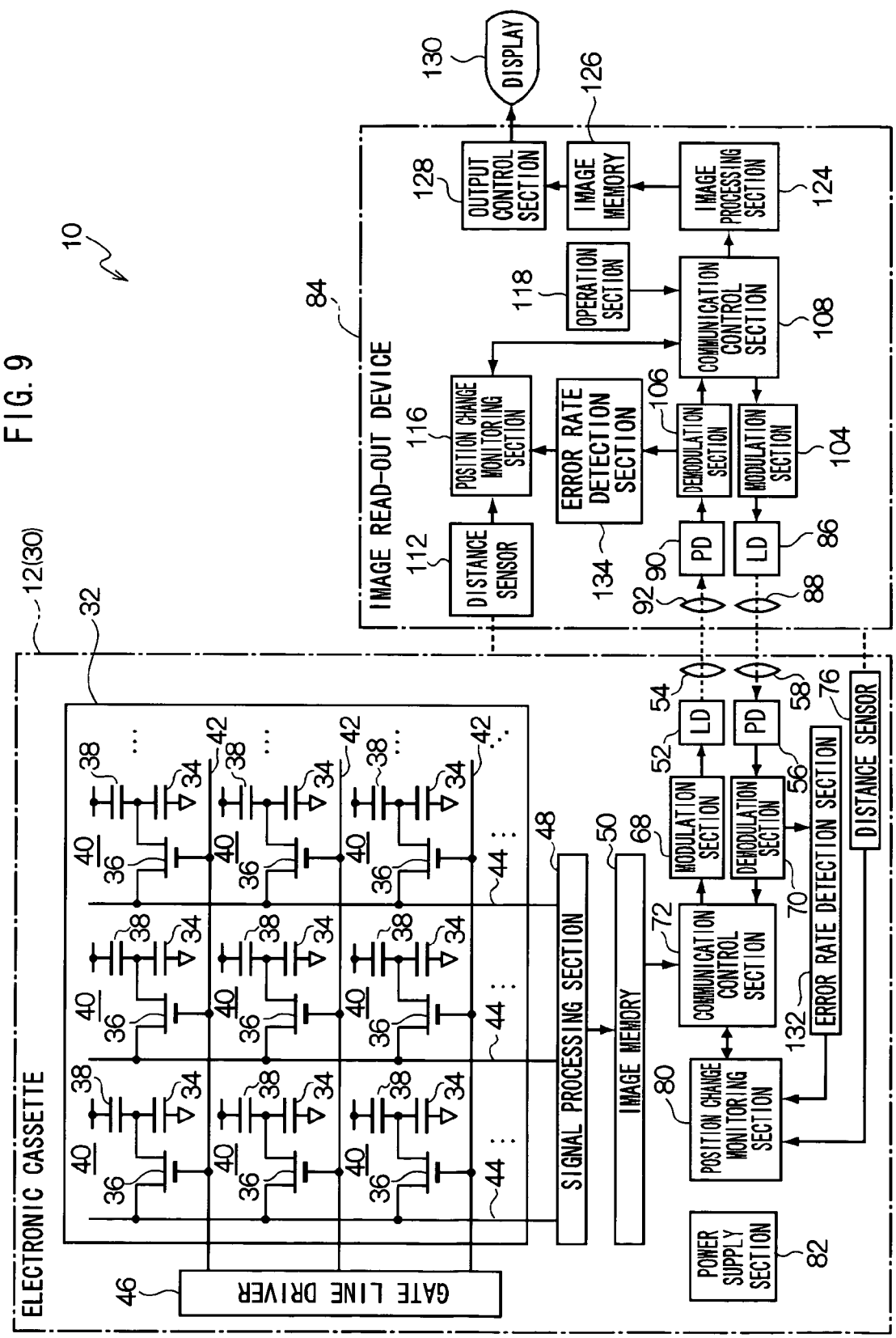
FIG. 9 is a block diagram showing schematic structure of an electronic cassette and image read-out device relating to a second exemplary embodiment.

The second exemplary embodiment differs from the first exemplary embodiment in that, as shown in FIG. 9, an error rate detection section 132 is provided in the electronic cassette 12 and an error rate detection section 134 is provided in the image read-out device 84.

The error rate detection section 132 provided in the electronic cassette 12 is connected to the demodulation section 70. The error rate detection section 132 inputs information demodulated by the demodulation section 70, and calculates a proportion of erroneous information in the demodulated information (hereinafter referred to as the error rate). The error rate detection section 132 is connected to the position change monitoring section 80, and outputs the calculated error rates to the position change monitoring section 80.

During communications between a device (the electronic cassette 12) and the image read-out device 84, the position change monitoring section 80 monitors the error rates found by the error rate detection section 132 and the changes in distance detected by the distance sensor 76, or the like. Thus, the position change monitoring section 80 performs position change monitoring processing (FIG. 10) which monitors for a change in the relative positions of the device (the electronic cassette 12) and the image read-out device 84.

The error rate detection section 134 provided in the image read-out device 84 is connected to the demodulation section 106. The error rate detection section 134 inputs information demodulated by the demodulation section 106, and calculates an error rate. The error rate detection section 134 is connected to the position change monitoring section 116, and outputs the error rates to the position change monitoring section 116.

The position change monitoring section 116 performs position change monitoring processing (FIG. 10) in the same way as the position change monitoring section 80 of the electronic cassette 12.

Figure 10:
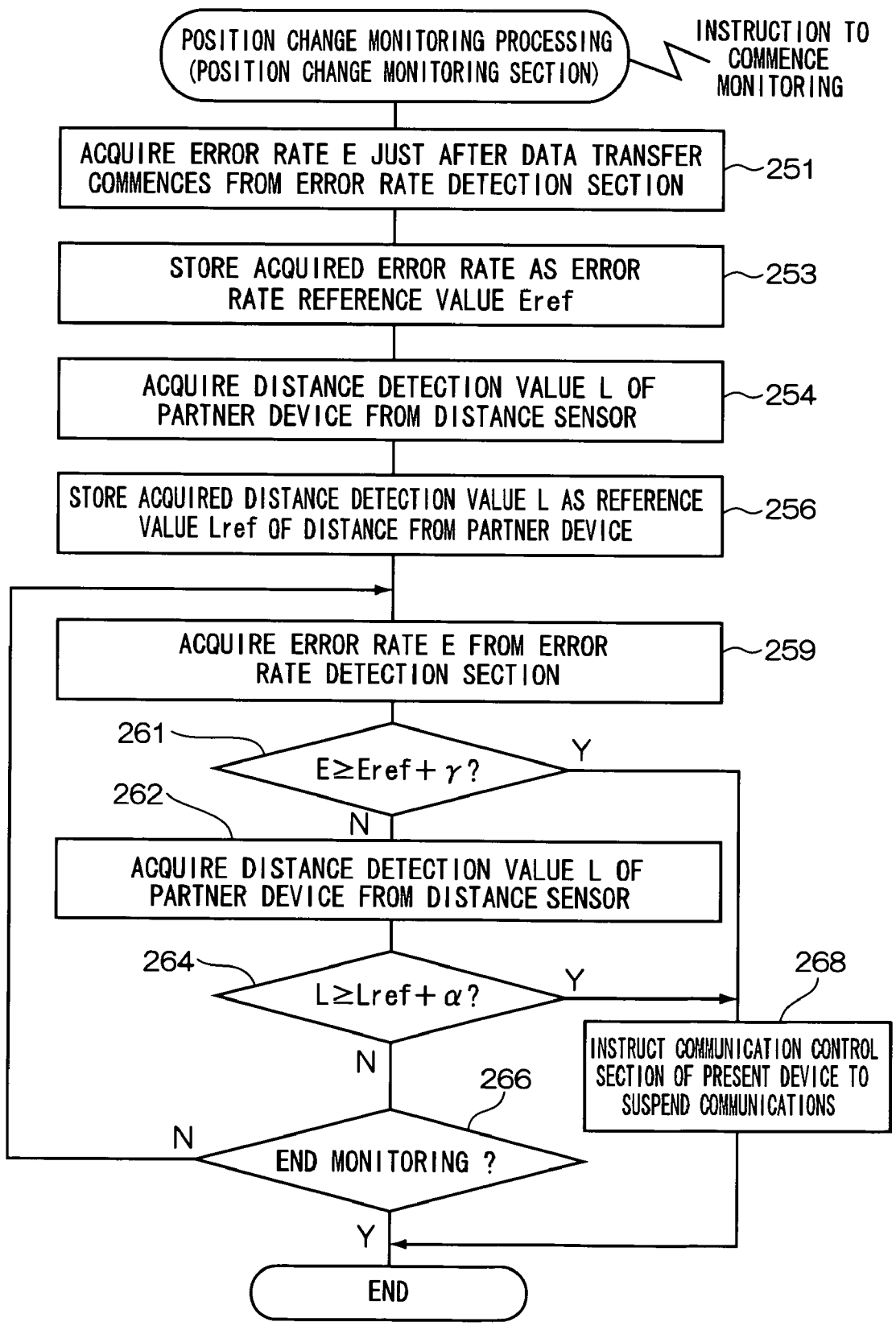
FIG. 10 is a flowchart showing details of position change monitoring processing relating to the second exemplary embodiment.

Next, of the position change monitoring position processing that is carried out by the position change monitoring sections 80 and 116 relating to the second exemplary embodiment, only portions that differ from the first exemplary embodiment will be described, referring to FIG. 10. The position change monitoring processing relating to the second exemplary embodiment, instead of detecting changes in the relative positions of the electronic cassette 12 and the image read-out device 84 on the basis of received laser light amounts at the PDs, detects changes in the relative positions of the electronic cassette 12 and the image read-out device 84 on the basis of error rates in demodulated information.

That is, in the position change monitoring processing relating to the second exemplary embodiment, an error rate E detected by the error rate detection section provided in a device is acquired from the error rate detection section at a time at which the PD receives laser light immediately after data transfer commences. Because this is a time just after the relative positions of the electronic cassette 12 and the image read-out device 84 have been adjusted to the communication-possible positional relationship, the error rate E, which is acquired in step 251, represents an error rate in the state in which the relative positions of the electronic cassette 12 and the image read-out device 84 are adjusted to the communication-possible positional relationship.

Herein, as the error rate E, any of the following may be employed: a minimum value or average value detected by the error rate detection section over a period in which the PD receives the laser light, and an error rate at which a cumulative frequency from the maximum value or minimum value in a histogram of detected values reaches a predetermined value. A different value may be used, provided it is a value that represents an error rate detected by the error rate detection section in the state in which the relative positions of the electronic cassette 12 and the image read-out device 84 are adjusted to the communication-possible positional relationship. Then, in step 253, the error rate E acquired in step 251 is stored in a built-in memory to serve as a reference value Eref of error rates at the error rate detection section. Subsequently, a distance detection value L is acquired from the distance sensor (step 254) and the acquired distance detection value L is stored to serve as the reference value Lref of distances from the partner device (step 256).

In step 259 of the position change monitoring processing relating to the second exemplary embodiment, a most recent error rate E from the error rate detection section of the device is again acquired. Then, in step 261, it is judged whether or not the error rate E acquired in step 259 is greater than a value for which a predetermined value γ is added to the error rate reference value Eref (i.e., $E \geq Eref + \gamma$). Herein, the size of the predetermined value γ may be switched in accordance with which of the values exemplified above for the error rate E (a maximum value, a minimum value or the like) is being used. When the judgement of step 261 is negative, it may be determined that, even if the error rate has increased, the amount of increase is within a tolerance range. Hence, the distance detection value L is again acquired from the distance sensor (step 262). If the acquired distance detection value L does not satisfy the condition $L \geq Lref + \alpha$ (i.e., if the judgement of step 264 is negative), the processing advances to step 266.

In this manner, steps 259 to 266 are repeated while communications between the electronic cassette 12 and the image read-out device 84 are being carried out, and changes in the error rate E and changes in the distance detection value L are monitored. If the relative positions of the electronic cassette 12 and the image read-out device 84 do not change in this period or amounts of change in the relative positions are very small, the error rate E and the distance detection value L do not change or amounts of change are very small. Therefore, the judgements of step 261 (and step 264) will not be positive, and the position change monitoring processing will be instructed to end by the communication control section of the device. Hence, the position change monitoring processing ends.

As the error rate herein, a frequency with which re-transmissions of information are requested from the partner device, a frequency with which error correction is carried out on the received information, or the like may be employed.

Third Exemplary Embodiment

Next, a third exemplary embodiment of the present invention will be described. Herein, portions that are the same as in the first exemplary embodiment are assigned the same reference numerals and will not be described. In the first exemplary embodiment, emissions of laser light from a partner device are stopped by instruction information that instructs a stoppage of emissions of laser light being transmitted to the partner device. In the third exemplary embodiment, wireless signals are periodically transmitted to the partner device, and the partner device emits laser light while wireless signals are being periodically received. In other words, emissions of laser light from the partner device are stopped by the periodic transmissions of wireless signals to the partner device being stopped.

Figure 11:
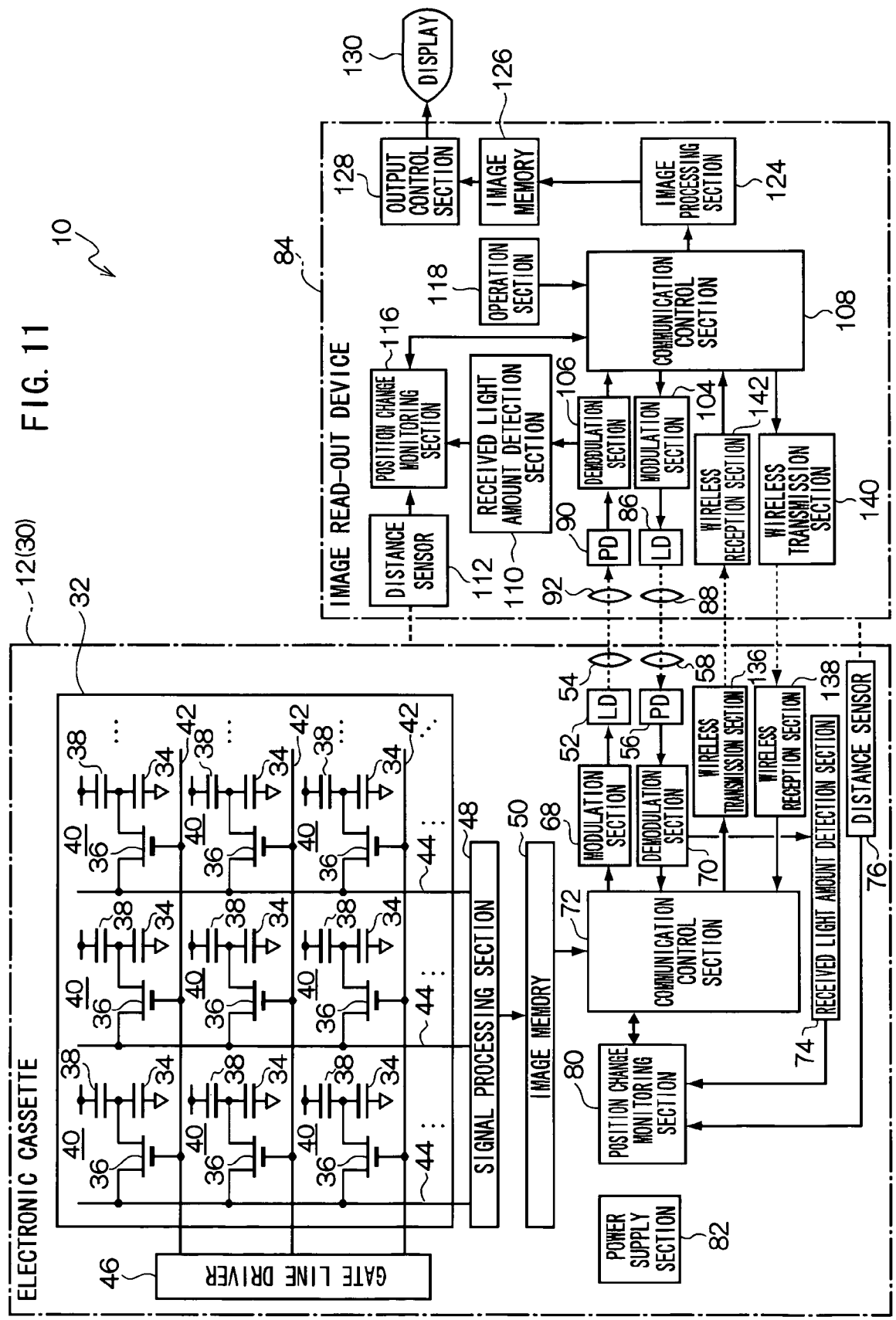
FIG. 11 is a block diagram showing schematic structure of an electronic cassette and image read-out device relating to a third exemplary embodiment.

In the present exemplary embodiment, as shown in FIG. 11, a wireless transmission section 136 and a wireless reception section 138 are provided at the electronic cassette 12 and a wireless transmission section 140 and a wireless reception section 142 are provided at the image read-out device 84. The wireless transmission sections 136 and 140 transmit wireless signals of, for example, infrared rays or the like, and each of the wireless reception sections 138 and 142 receives the wireless signals transmitted from the wireless transmission section of the partner device.

Figure 12A:
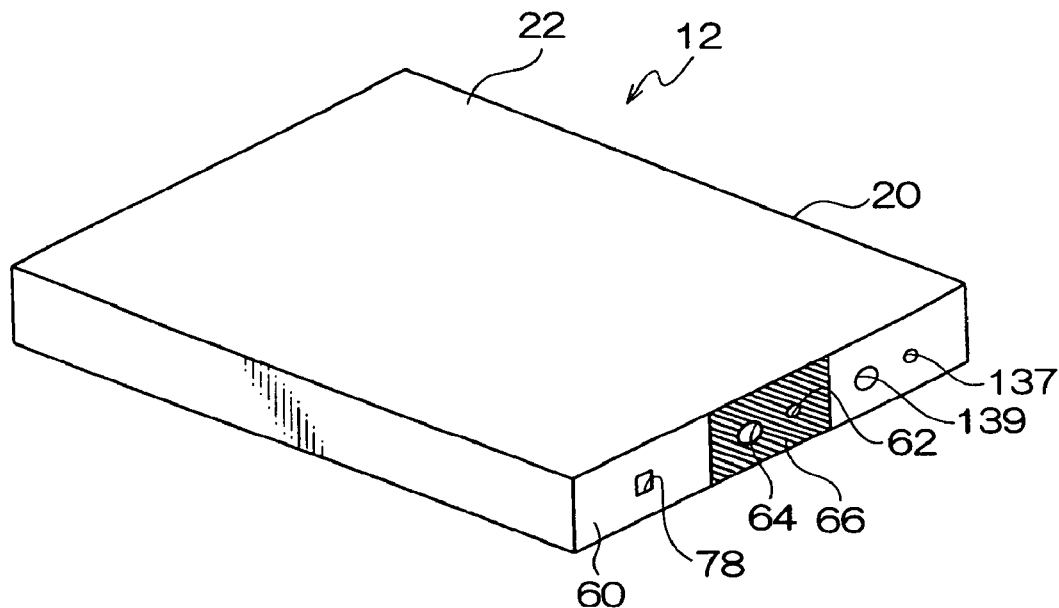
FIG. 12A is a perspective view showing the exterior of the electronic cassette.

In the present exemplary embodiment, as shown in FIG. 12A, an emission hole 137 for passing the wireless signals transmitted from the wireless transmission section 136 and a light reception hole 139 for passing the wireless signals from the partner device are provided in the opposing face 60 of the casing 20 of the electronic cassette 12. In FIG. 12A, a side face that borders a short side of the irradiation surface 22 is used as the opposing face 60 in which the emission hole 137 and the light reception hole 139 are provided. However, this is not limiting. The opposing face 60 may be a side face that borders a long side of the irradiation surface 22, or may be the bottom face (the face at the opposite side from the irradiation surface 22) or the like.

The wireless signals transmitted from the wireless transmission section 136 pass through the emission hole 137 and are emitted to outside the casing 20. The wireless signals from the partner device pass through the light reception hole 139 and are received at the wireless reception section 138.

The wireless transmission section 136 and the wireless reception section 138 are connected to the communication control section 72. While laser light is being emitted by the LD 52, the communication control section 72 performs control such that wireless signals are periodically transmitted from the wireless transmission section 136, and performs control such that emissions of laser light by the LD 52 are stopped if periodic wireless signals transmitted from the partner device cease to be regularly received by the wireless reception section 138.

Figure 12B:
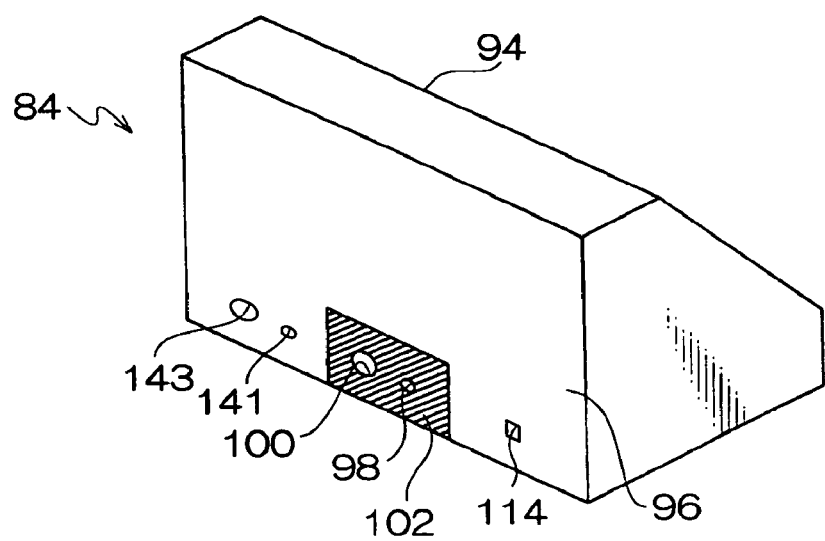
FIG. 12B is a perspective view showing the exterior of the image read-out device.

As shown in FIG. 12B, an emission hole 141 for passing the wireless signals transmitted from the wireless transmission section 140 and a light reception hole 143 for passing wireless signals from outside (for example, from the electronic cassette 12) are provided in the opposing face 96 of the casing 94 covering the exterior of the image read-out device 84.

The wireless signals transmitted from the wireless transmission section 140 pass through the emission hole 141, and are emitted to outside the casing 94. The wireless signals from the partner device pass through the light reception hole 143 and are received at the wireless reception section 142.

The wireless transmission section 140 and the wireless reception section 142 are connected to the communication control section 108. While laser light is being emitted by the LD 86, the communication control section 108 performs control such that wireless signals are periodically transmitted from the wireless transmission section 140, and performs control such that emissions of laser light by the LD 86 are stopped if periodic wireless signals transmitted from the partner device cease to be regularly received by the wireless reception section 142.

Figure 13A:
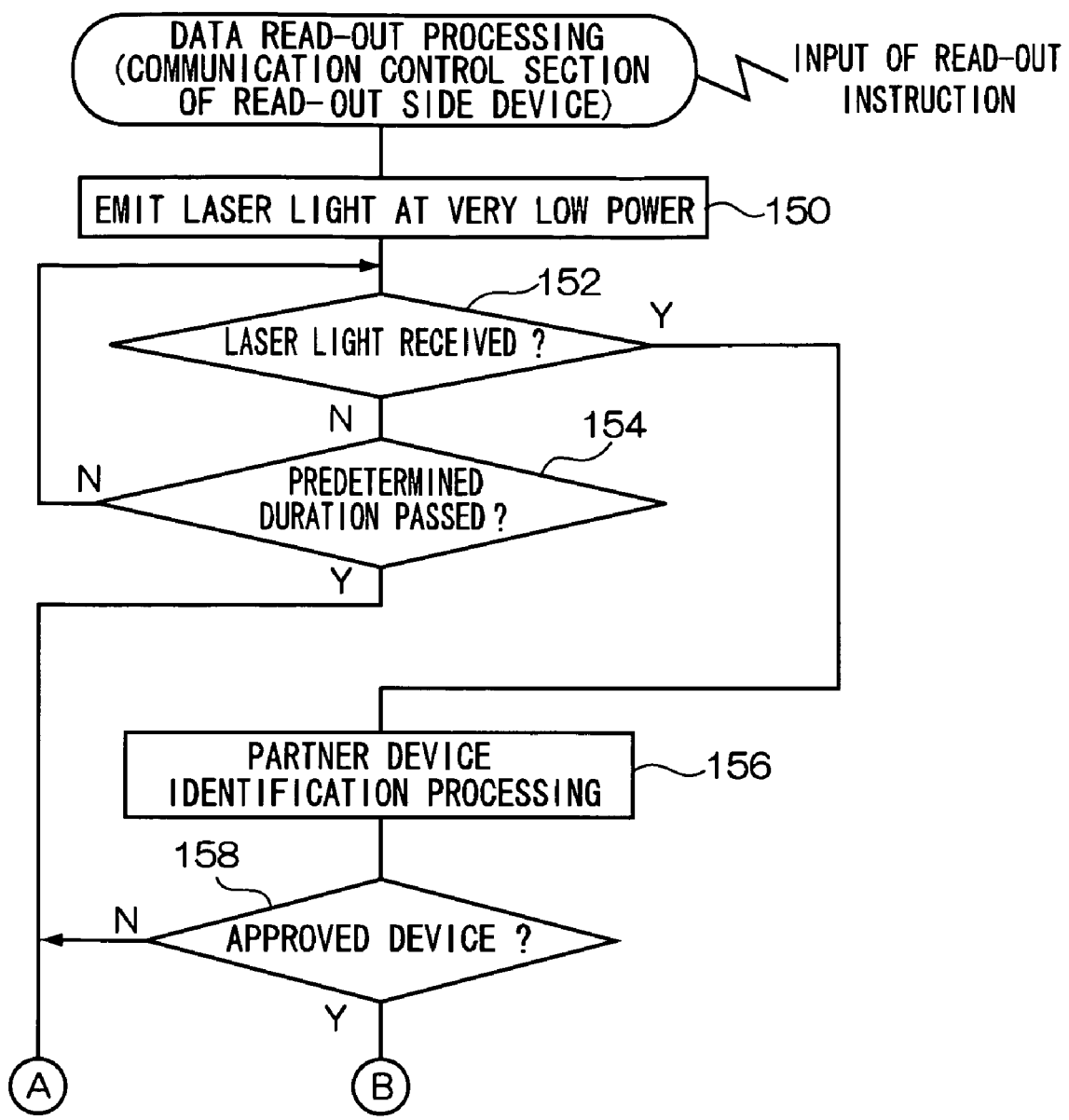
FIG. 13A is a flowchart showing details of data read-out processing relating to the third exemplary embodiment.
Figure 13B:
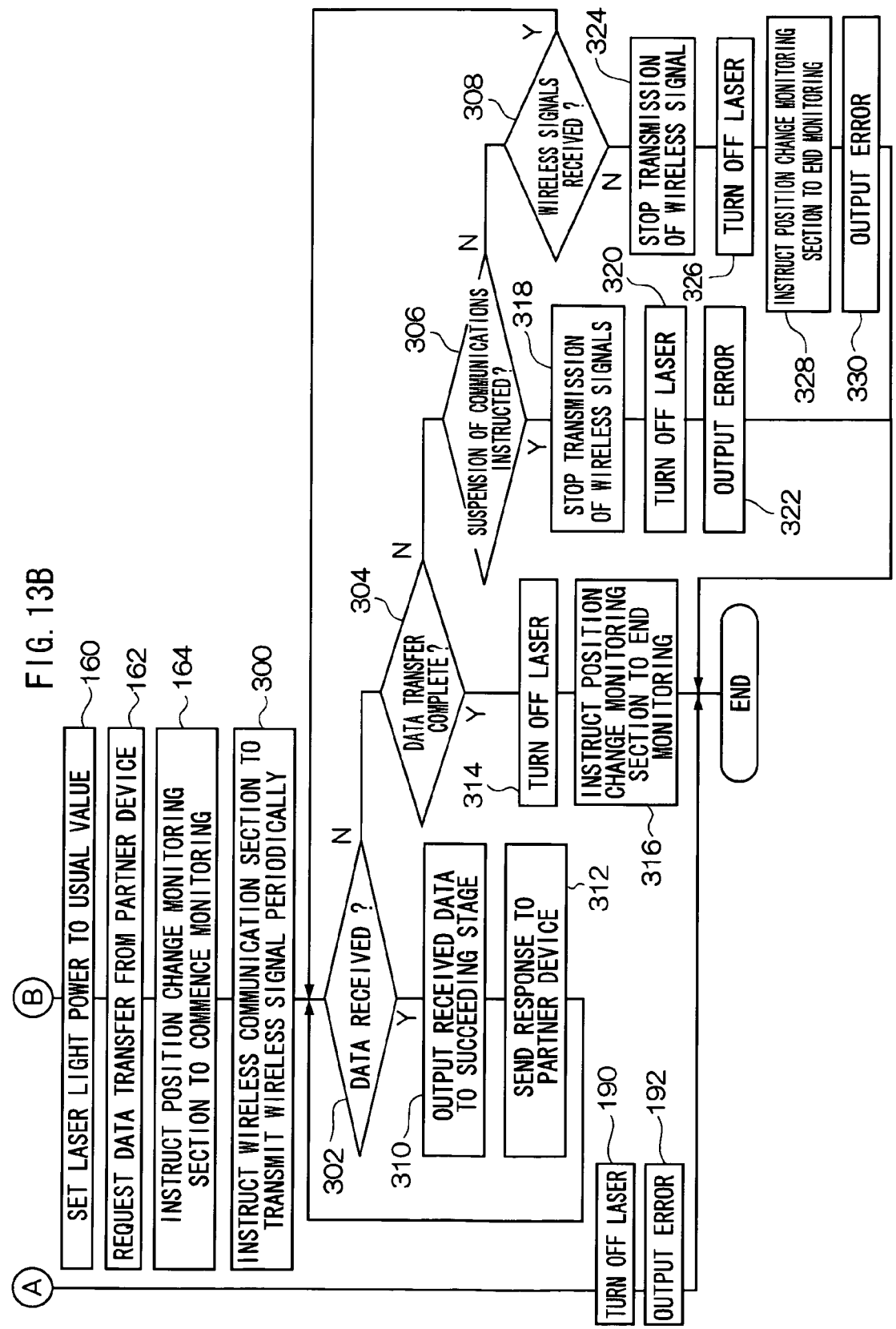
FIG. 13B is a flowchart showing details of data read-out processing relating to the third exemplary embodiment.
Figure 14A:
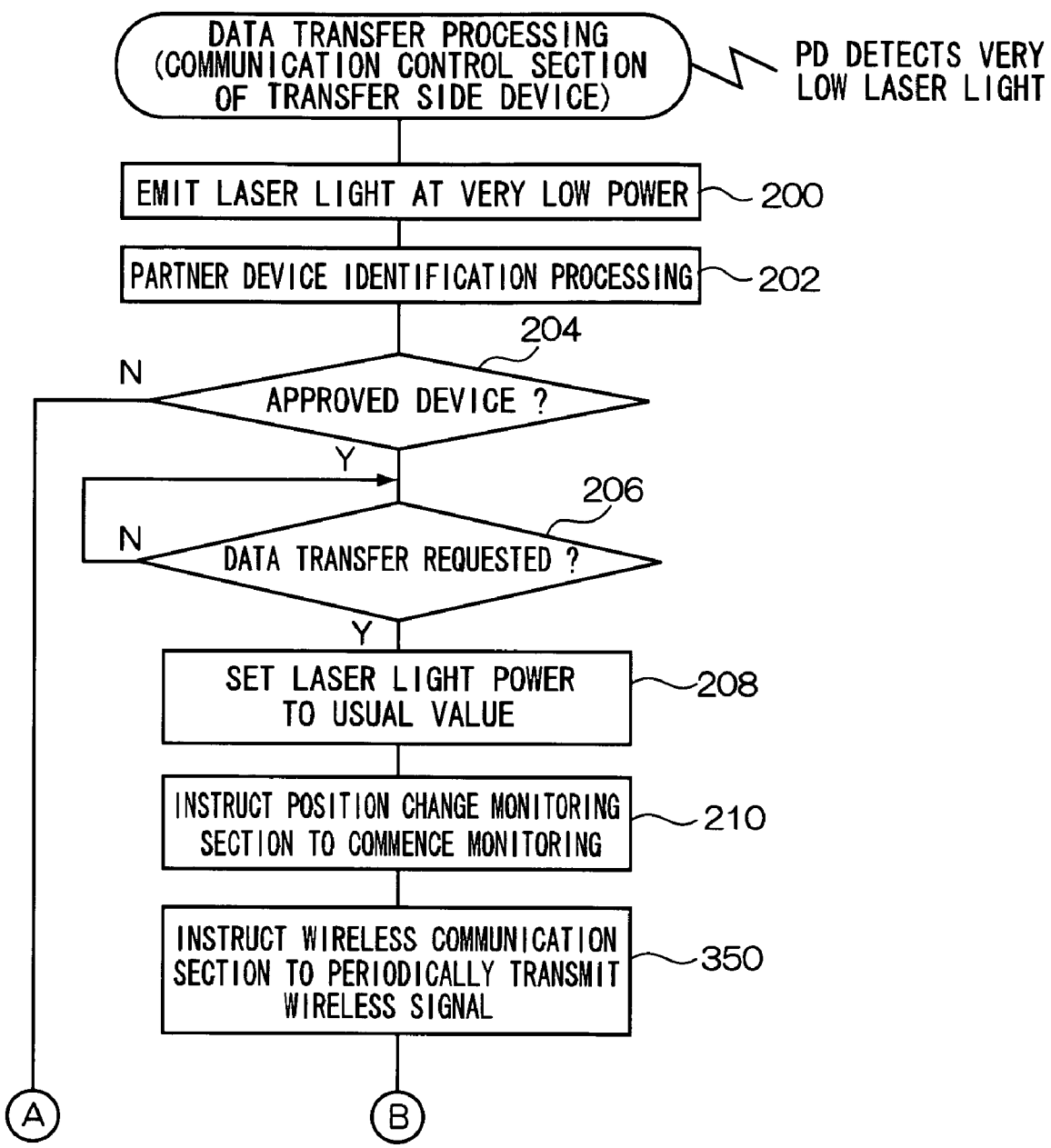
FIG. 14A is a flowchart showing details of data transfer processing relating to the third exemplary embodiment.

Next, data read-out processing that is performed by the communication control section 108 of the image read-out device 84 relating to the third exemplary embodiment will be described with reference to FIGS. 13A and 13B, and data transfer processing that is performed by the communication control section 72 of the electronic cassette 12 relating to the third exemplary embodiment will be described with reference to FIGS. 14A and 14B. In the following, only portions that differ from the first exemplary embodiment will be described.

In step 164 of the data read-out processing (FIG. 13B), the position change monitoring section 116 is instructed to commence execution of the position change monitoring processing (FIG. 6), after which the processing advances to step 300. In step 300, the wireless transmission section 140 is instructed to periodically transmit wireless signals.

Then, in step 302, it is judged whether or not data transferred from the partner device is being received. If this judgement is negative, the processing advances to step 304, and it is judged whether or not the partner device has given notice of completion of the data transfer. If this judgement is also negative, the processing advances to step 306, and it is judged whether or not a suspension of communications with the partner device has been instructed by the position change monitoring section 116. If this judgement is negative, the processing advances to step 308, and it is judged whether or not wireless signals are being received from the partner device periodically. If this judgement is positive, the processing returns to step 302, and steps 302 to 308 are repeated until the judgement of step 302, step 304 or step 306 is positive or the judgement of step 308 is negative.

Meanwhile, in step 210 of the data transfer processing (FIG. 14A), the position change monitoring section 80 is instructed to commence execution of the position change monitoring processing (FIG. 6), after which the processing advances to step 350. In step 350, the wireless transmission section 136 is instructed to periodically transmit wireless signals.

Next, in step 352, reading-out from the image memory 50 of image data that is a transfer subject to be transferred to the image read-out device 84 is attempted.

Then, in step 354, it is judged whether or not transfer subject image data (image data that has not been transferred to the image read-out device 84) is stored in the image memory 50. If this judgement is positive, the processing advances to step 356, and transfer subject image data that has been successfully read out from the image memory 50 is transmitted to the partner device (the image read-out device 84) by laser light. In step 358, it is judged whether or not a response has been received from the image read-out device 84. If this judgement is negative, the processing advances to step 360, and it is judged whether or not a suspension of communications with the partner device has been instructed by the position change monitoring section 80. If this judgement is negative, the processing advances to step 362, and it is judged whether or not wireless signals are being periodically received from the partner device. If this judgement is positive, the processing returns to step 358. Steps 358 to 362 are repeated until the judgement of step 358 or step 360 is positive or the judgement of step 362 is negative.

When the image data is transferred from the electronic cassette 12 by laser light as described above and the image data is received by the image read-out device 84, the judgement of step 302 of the data read-out processing (FIG. 13B) is positive, the processing advances to step 310, and the image data received from the partner device (the electronic cassette 12) is outputted to a succeeding stage (in the present exemplary embodiment, the image processing section 124).

Hence, the image data received by the image read-out device 84 is subjected to various kinds of image processing by the image processing section 124 and then stored in the image memory 126. Next, in step 312, a response to the data transmission of the partner device (the electronic cassette 12) is transmitted by laser light, and the processing returns to step 302. When this response is received by the partner device (the electronic cassette 12), the judgement of step 358 of the data transfer processing (FIG. 14B) is positive, and the processing returns to step 352. Thus, as long as transfer subject image data is stored in the image memory 50 of the electronic cassette 12, the transfer of image data to the image read-out device 84 is continued by steps 302 to 312 of the data read-out processing (FIG. 13B) being repeated and steps 352 to 362 of the data transfer processing (FIG. 14B) being repeated.

Then, when all the image data stored in the image memory 50 has been transferred to the image read-out device 84, the judgement of step 354 of the data transfer processing (FIG. 14B) is negative, the processing advances to step 364, and the partner device (the image read-out device 84) is notified of the completion of data transfer with laser light. In step 366, emissions of laser light from the LD 52 are stopped. Then, in step 368, the position change monitoring section 80 is instructed to end the position change monitoring processing (FIG. 6), and the data transfer processing (FIGS. 14A and 14B) ends. When the completion of data transfer is notified from the electronic cassette 12, in the data read-out processing (FIGS. 13A and 13B), the judgement of step 304 is positive, the processing advances to step 314, and emissions of laser light from the LD 86 are stopped. Then, in step 316, the position change monitoring section 116 is instructed to end the position change monitoring processing (FIG. 6), and the data read-out processing (FIGS. 13A and 13B) ends.

In a case in which the position change monitoring section 116 of the image read-out device 84 instructs the communication control section 108 to suspend communications, the judgement of step 306 of the data read-out processing (FIGS. 13A and 13B) is positive, the processing advances to step 318 and it is instructed that the periodic transmissions of wireless signals to the partner device be stopped.

In step 320, emissions of laser light from the LD 86 are stopped. Then, in step 322, error processing is carried out, displaying an error message giving notice of the suspension of communications together with the reason (that the casing has moved significantly or the like) at the display 120 or the like, and the data read-out processing (FIGS. 13A and 13B) ends.

When the periodic transmissions of wireless signals from the wireless transmission section 140 of the image read-out device 84 have stopped, step 362 of the data transfer processing (FIG. 14B) is negative, the processing advances to step 370 and it is instructed that the periodic transmissions of wireless signals to the partner device be stopped. In step 372, emissions of laser light from the LD 52 are stopped. Then, in step 374, the position change monitoring section 80 is instructed to end the position change monitoring processing (FIG. 6), and the data transfer processing (FIGS. 14A and 14B) ends.

Alternatively, in a case in which the position change monitoring section 80 of the electronic cassette 12 instructs the communication control section 72 to suspend communications, the judgement of step 360 of the data transfer processing (FIG. 14B) is positive, the processing advances to step 376 and it is instructed that the periodic transmissions of wireless signals to the partner device be stopped.

In step 378, emissions of laser light from the LD 52 are stopped and the data transfer processing (FIGS. 14A and 14B) ends.

When the periodic transmissions of wireless signals from the wireless transmission section 136 of the electronic cassette 12 have stopped, step 308 of the data read-out processing (FIG. 13B) is negative, the processing advances to step 324 and it is instructed that the periodic transmissions of wireless signals to the partner device be stopped. In step 326, emissions of laser light from the LD 86 are stopped. Then, in step 328, the position change monitoring section 116 is instructed to end the position change monitoring processing (FIG. 6), and the data read-out processing (FIGS. 13A and 13B) ends.

According to the processing described above, if a change in the relative positions of the electronic cassette 12 and the image read-out device 84 that may lead to a leakage of laser light is detected by either of the position change monitoring section 80 of the electronic cassette 12 and the position change monitoring section 116 of the image read-out device 84, emissions of laser light from the electronic cassette 12 and emissions of laser light from the image read-out device 84 are both stopped.

Now, in the exemplary embodiments described above, a partial region of the opposing face 60 of the casing 20 of the electronic cassette 12 which includes the surroundings of the light reception hole 64 (and the emission hole 62) is covered with the diffusion member 66, and a partial region of the opposing face 96 of the casing 94 of the image read-out device 84 which includes the surroundings of the light reception hole 100 (and the emission hole 98) is covered with the diffusion member 102. Therefore, even if a relatively large change in the relative positions occurs during communications between the electronic cassette 12 and the image read-out device 84 and a state temporarily occurs in which laser light emitted from the electronic cassette 12 and/or the image read-out device 84 is illuminated at a position misplaced from the light reception hole of the opposing face in a period until the emissions of laser light are stopped by the above processing, the laser light illuminated at the opposing face of the partner device is scattered in a plurality of mutually different directions by the diffusion member provided at a position of illumination of this laser light. Therefore, even if the reflected laser light leaks out from the gap between the opposing face 60 of the electronic cassette 12 and the opposing face 96 of the image read-out device 84, light amounts of laser light that is illuminated at any particular location outside the gap can be kept very weak.

In the above exemplary embodiments, a mode has been described in which the partial region of the opposing face 60 of the casing 20 of the electronic cassette 12 including the surroundings of the light reception hole 64 (and the emission hole 62) is covered with the diffusion member 66, and the partial region of the opposing face 96 of the casing 94 of the image read-out device 84 including the surroundings of the light reception hole 100 (and the emission hole 98) is covered with the diffusion member 102. However, this is not limiting. Instead of a diffusion member, a partial region may be covered with an absorbing member that absorbs most of laser light illuminated thereon (for example, an optical filter that features wavelength selectivity (specifically an optical filter that is absorbent of light in the wavelength range of the laser light that is illuminated), a bristly member, a porous member, a member with a black surface or the like). For example, optical absorption filters are marketed in which, because of a constitution in which an optically absorbent material is dispersed in a nitrous material, a transmission rate for light at 1300 nm, which is a wavelength that is excellent for communications between the electronic cassette 12 and the image read-out device 84, is of the order of 20% (i.e., an optical attenuation rate of about 80% per mm of optical path length). By using this kind of optical absorption filter and applying an anti-reflection coating or the like to the surface of the optically absorbent filter in order to suppress surface-reflected light, an absorption material capable of suppressing reflected light to a few percent of incident light may be realized.

In a case in which an absorption member such as that described above is provided instead of a diffusion member, if a relatively large change in the relative positions occurs during communications between the electronic cassette 12 and the image read-out device 84 and a state temporarily occurs in which laser light emitted from the electronic cassette 12 and/or the image read-out device 84 is illuminated at a position misplaced from the light reception hole of the opposing face in a period until the change in relative positions is detected and the emissions of laser light are stopped, the illuminating device illuminates the laser light misplaced from the light reception hole at the absorption member, and it is mostly absorbed by the absorption member. Therefore, light amounts of laser light that leaks out from the gap between the opposing face 60 of the electronic cassette 12 and the opposing face 96 of the image read-out device 84 can be kept very weak.

When non-visible laser light outside the visible region is used for communications between the electronic cassette 12 and the image read-out device 84, instead of the diffusion members 66 and 102, the above-mentioned partial regions may be covered with light-emitting (fluorescent) members that, when non-visible light is illuminated thereat, emit a fraction of the illumination as light in the visible region. For example, if the wavelength of the laser light is in the infrared region, an optical path identification fluorescent sheet for near-infrared (LASER DETECTION CARD IR, produced by EDMUND OPTICS) or the like may be employed as the above-mentioned light-emitting (fluorescent) member.

In a case in which a light-emitting (fluorescent) member is provided instead of a diffusion member as described above, an effect of reducing laser light amounts as with a diffusion member, an absorption member or the like is obtained. Moreover, if a relatively large change in the relative positions occurs during communications between the electronic cassette 12 and the image read-out device 84 and a state temporarily occurs in which laser light emitted from the electronic cassette 12 and/or the image read-out device 84 is illuminated at a position misplaced from the light reception hole of the opposing face in a period until the change in relative positions is detected and the emissions of laser light are stopped, the illuminating device illuminates the laser light misplaced from the light reception hole at the light-emitting (fluorescent) member and the light-emitting (fluorescent) member illuminated with the non-visible laser light produces light (i.e., emits visible light). Therefore, a user may recognize that the illumination position of the non-visible laser light is misplaced from the light reception hole and that non-visible laser light could leak out from the gap between the opposing face 60 of the electronic cassette 12 and the opposing face 96 of the image read-out device 84. Thus, the user may be prompted to take countermeasures to prevent the illumination of leaking non-visible laser light at particular locations outside the gap (positions at which the illumination of laser light is not desirable).

Further, as the distance sensors 76 and 112 (distance detection sections) in the exemplary embodiment described above, structures that detect the distance of an object on the basis of a duration from light being emitted by a light-emitting element to the emitted light being reflected at the object and detected by a light-detecting element have been described. However, constitutions of the present invention are not limited thus. Constitutions are possible in which a light detection position is detected by a light-detecting element when light is emitted from a light-emitting element and reflected at an object, and the distance of the object is detected in accordance with the principles of triangulation. Further constitutions are possible in which an electric field generation section that generates an electric field of a certain strength or a magnetic field generation section that generates a magnetic field of a certain strength is provided at the partner device, a strength of the electric field or magnetic field generated by the electric field generation section or magnetic field generation section of the partner device is detected, and the distance of the object is detected on the basis of the detected strength.

Furthermore, the distance detection sections are not to be limited to structures that detect the distance of a partner device. Constitutions are possible which detect or estimate whether or not a distance from a partner device is below a threshold. For example, in the case of a constitution such that communications are carried out with laser light in a state in which the devices that perform communications with laser light are touching against the respective partner devices or are very close to the partner devices, a structure that is provided with a movable member and a displacement detection section that detects displacements of the movable member (for example, a limit switch or the like) may be used as a distance detection section. The distance detection section (the limit switch and the like) is provided such that, in the state in which the devices that perform communications with laser light are touching or are very close together, the movable member is touched by the casing (casing body) of the partner device and moved. It is detected whether or not a displacement of the movable member has been sensed by the displacement detection section, and thus whether or not the distance from the partner device is less than the threshold.

There may be cases in which the devices that perform communications with laser light are equipped with wireless communication sections that carry out wireless communications using electromagnetic waves other than the laser light. The wireless communications by these wireless communication sections may be limited in regard to distances between the devices, positional relationships of the devices and the like for which communication is possible, and the communication system (for example, wireless communication using infrared light or the like) may vary greatly in communication quality in accordance with the distance between the devices, the positional relationship of the devices and the like. In such a case, a distance detection section may be constituted so as to acquire information such as a strength of the electromagnetic waves from the partner device that are detected by the wireless communication section for wireless communications, error rates of wireless communications (for example, a frequency with which re-transmissions of information are requested from the partner device, a frequency with which error correction is performed on the received information or the like) and the like. On the basis of comparison results when the acquired information is compared with predetermined values, the distance detection section estimates whether or not the distance of the partner device is below a threshold (or whether or not a positional relationship with the partner device is suitable).

A distance detection section may be provided at only one of a device and a partner device that carry out communications with laser light. This is the same as a case in which one of the device and the partner device emits laser light to perform transmissions of information, and the other performs transmissions of information with a different communications section (for example, infrared or the like). Such a case may be formed such that, when the distance detection section provided at only one of the device and the partner device detects or estimates that the distance between the devices is greater than a predetermined value, the device at which the distance detection section is provided performs processing to instruct the device at which a distance detection section is not provided to suspend communications (to stop emissions of laser light) (this processing is unnecessary if the device at which a distance detection section is not provided is a structure that does not emit laser light) and also performs processing to stop emissions of laser light from the device (this processing is unnecessary if the device at which the distance detection section is provided is a structure that does not emit laser light).

Instead of a distance detection sensor, an ambient light sensor may be provided, a detection region of which is a toroid around the light reception holes of the device and the partner device. Changes in the relative positions of the device and the partner device may be detected by detecting light reception amounts of laser light with the ambient light sensor. Furthermore, both a distance detection section and an ambient light sensor may be provided to detect changes in the relative positions.

Further, in the above exemplary embodiments, a mode has been described in which, when a relatively large change in the relative positions of the electronic cassette 12 and the image read-out device 84 that may lead to leakage of laser light is detected by the position change detection processing of the position change detection section of a device, emissions of laser light from the partner device are stopped by the partner device being instructed to suspend communications. However, the present invention is not limited thus. In particular, a constitution is possible in which the device transmits predetermined information to the partner device periodically (this information may be represented by a standard response to information transmitted from the partner device) as long as there are no problems, and the partner device performs transmissions of information by laser light as long as the predetermined information is being received. When a relatively large change in the relative positions is detected, the transmissions of the predetermined information to the partner device are stopped, and hence the emissions of laser light from the partner device are stopped. In such a case, a duration from the relatively large change in the relative positions being detected until the emissions of laser light by the partner device are stopped depends on the interval of times of transmission of the predetermined information. Therefore, a constitution such that the predetermined information is transmitted with as short an interval as possible is desirable.

Further, in the above exemplary embodiments, a mode has been described in which, when a relatively large change in the relative positions of the electronic cassette 12 and the image read-out device 84 that may lead to leakage of laser light is detected by the position change detection processing of the position change detection section, emissions of laser light from the electronic cassette 12 and the image read-out device 84 are respectively stopped. However, the present invention is not limited thus. A warning may be given to a user and the user prompted to give their attention, by the performance of one or more of, for example, flashing a lamp, sounding a buzzer and displaying a warning message at the display 120. Both stopping emissions of laser light and outputting a warning may be implemented.

Further, in the above exemplary embodiments, a mode has been described in which the electronic cassette 12 and the image read-out device 84 that serve as electronic apparatuses relating to the present invention perform communications by each emitting laser light. However, constitutions are possible such that one of the devices carrying out communications implements transmissions of information by emitting laser light and the other implements transmissions of information with a different communications section (for example, infrared or the like). In such a case, with a view to realizing wireless communications with very high propagation rates using infrared laser light, it is desirable to select the device that transmits larger volumes of information as the device that implements transmissions of information by emitting laser light (for example, if the apparatuses are an electronic cassette and an image read-out device, the electronic cassette which performs transmissions of image data).

In the above exemplary embodiments, the electronic cassette 12 and the image read-out device 84 are described as an excellent example relating to the present invention, but the present invention is not to be limited thus. The present invention may be applied to arbitrary electronic devices that carry out wireless communications with other devices. In particular, with a view to realizing wireless communications with very high propagation rates using infrared laser light, an electronic apparatus where one or more of devices is portable and in which large volumes of data are exchanged by wireless communications or there are high requirements with respect to exchanging large volumes of data is excellent. For example: an apparatus of a photography device such as a digital still camera, digital video camera or the like and a PC, printer or the like that receives still image data, video image data or the like from the photography device may be employed as the electronic apparatus relating to the present invention, and wireless communications between the devices implemented with laser light; an apparatus of a scanner that is portable and a PC, printer or the like that receives still image data from the scanner may be employed as the electronic apparatus relating to the present invention, and wireless communications between the devices implemented with laser light; and portable apparatuses (for example, portable telephones, PDAs and the like) that are equipped with one or more of photography functions for still images, moving images or the like and music playback functions may be employed as electronic apparatuses relating to the present invention, and wireless communications for exchanging image data, music data or the like between these portable apparatuses implemented with laser light.

Further, although the above exemplary embodiment is formed so as to illuminate laser light with a wavelength in the infrared range, the laser light may be non-visible laser light with a wavelength outside the infrared range and outside the visible range.

What is claimed is:

1. A system comprising a device and a partner device; the system comprising:
   a reception section that, in a state in which relative positions of a housing of the device and a housing of the partner device are adjusted to a communication-possible position, receives transmission subject information from the partner device by detecting laser light that is incident in a light reception region provided on an outer face of the housing of the device and demodulating the transmission subject information from results of detection of the laser light,
   the partner device including
      a first emission section that emits the laser light and
      a first modulation section that modulates the laser light emitted from the first emission section in accordance with the transmission subject information, and, in the state in which the relative positions of the housings of the device and the partner device are adjusted to the communication-possible position, the laser light emitted from the first emission section of the partner device being incident in the light reception region;

a reception condition detection section that detects deterioration of a reception condition in reception of the transmission subject information from the partner device by the reception section; and a control section that, if deterioration of the reception condition is detected by the reception condition detection section, implements at least one of producing a warning and stopping emission of the laser light from the partner device.

2. The system according to claim 1, wherein the reception condition detection section judges that the reception condition has deteriorated if a light amount of laser light detected by the reception section falls below a threshold.

3. The system according to claim 2, wherein the reception condition detection section specifies a reference value on the basis of a light amount of laser light detected by the reception section in the state in which the relative positions of the housing of the partner device and the housing of the device are adjusted to the communication-possible position and laser light is incident in the light reception region, and uses a value that is smaller than the specified reference value by a predetermined value as the threshold.

4. The system according to claim 3, wherein the reception condition detection section specifies as the reference value a value that represents one of:

an amount of laser light detected by the reception section at a point in time at which the reception section commences reception of the transmission subject information from the partner device, and an amount of laser light detected by the reception section in a period from the reception section commencing reception of the transmission subject information from the partner device until a predetermined duration has passed.

5. The system according to claim 1, wherein the reception condition detection section determines that the reception condition has deteriorated if an error rate detected by the reception section, in reception by the reception section of the transmission subject information from the partner device, rises above a threshold.

6. The system according to claim 5, wherein the reception condition detection section specifies a reference value on the basis of an error rate detected by the reception section in the state in which the relative positions of the housing of the partner device and the housing of the device are adjusted to the communication-possible position and laser light is incident in the light reception region, and uses a value that is larger than the specified reference value by a predetermined value as the threshold.

7. The system according to claim 6, wherein the reception condition detection section specifies as the reference value a value that represents one of:

an error rate detected by the reception section at a point in time at which the reception section commences reception of the transmission subject information from the partner device, and an error rate detected by the reception section in a period from the reception section commencing reception of the transmission subject information from the partner device until a predetermined duration has passed.

8. The system according to claim 1, further comprising a first transmission section that is capable of transmitting information to the partner device, wherein the control section stops emission of the laser light from the partner device by causing instruction information that instructs a stoppage of emission of the laser light to be transmitted to the partner device by the first transmission section.

9. The system according to claim 1, further comprising a second transmission section that, while the reception section is satisfactorily receiving the transmission subject information from the partner device, periodically transmits predetermined information to the partner device, wherein the partner device is configured to, while periodically receiving the predetermined information, emit the laser light modulated in accordance with the transmission subject information from the first emission section, and the control section stops emission of the laser light from the partner device by causing transmission of the predetermined information to the partner device by the second transmission section to be stopped.

10. The system according to claim 1, wherein the system further comprises:

a second emission section that emits laser light; and a second modulation section that modulates the laser light emitted from the second emission section in accordance with transmission subject information, and to implement two-way communication by laser light with the partner device, and the control section stops emission of the laser light from the second emission section if emission of the laser light from the partner device is stopped.

11. The system according to claim 1, wherein the laser light comprises non-visible laser light with a wavelength outside the visible range.

12. The system according to claim 11, wherein the non-visible laser light comprises laser light with a wavelength in the infrared range.

13. The system according to claim 1, wherein the partner device comprises any of an imaging device, a portable communication device, a portable radiographic image conversion device, and an image read-out device that reads image information from a portable radiographic image conversion device.

14. A system including a device and a partner device that communicate with one another by laser light, one device of the device and the partner device being conveyable away from the other device of the device and the partner device, wherein the other device comprises:

a first emission section that emits laser light;

a first modulation section that modulates the laser light emitted from the first emission section in accordance with transmission subject information; and a housing that accommodates the first emission section and the first modulation section, and the one device includes:

a housing, at an outer face of which a light reception region is provided;

a reception section that, in a state in which relative positions of the housing of the other device and a housing of the one device are adjusted to a communication-possible position, at which the laser light emitted from the first emission section of the other device is incident in a light reception region provided on an outer face of the housing of the one device, receives the transmission subject information from the other device by detecting laser light that is incident in the light reception region and demodulating the transmission subject information from results of detection of the laser light;

a reception condition detection section that detects deterioration of a reception condition in reception of the transmission subject information from the other device by the reception section; and a control section that, if deterioration in the reception condition is detected by the reception condition detection section, implements at least one of producing a warning and stopping emission of the laser light from the other device.

* * * * *